United States Patent
Nagata et al.

(10) Patent No.: US 10,067,454 B2
(45) Date of Patent: Sep. 4, 2018

(54) IMAGE FORMING APPARATUS

(71) Applicants: Atsushi Nagata, Kanagawa (JP); Shinya Tanaka, Kanagawa (JP); Hirokazu Ishii, Tokyo (JP); Kenji Sugiura, Kanagawa (JP); Takehide Mizutani, Tokyo (JP); Keigo Nakamura, Kanagawa (JP); Yuuji Wada, Kanagawa (JP); Naoto Kochi, Tokyo (JP)

(72) Inventors: Atsushi Nagata, Kanagawa (JP); Shinya Tanaka, Kanagawa (JP); Hirokazu Ishii, Tokyo (JP); Kenji Sugiura, Kanagawa (JP); Takehide Mizutani, Tokyo (JP); Keigo Nakamura, Kanagawa (JP); Yuuji Wada, Kanagawa (JP); Naoto Kochi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/483,221

(22) Filed: Apr. 10, 2017

(65) Prior Publication Data
US 2017/0299994 A1    Oct. 19, 2017

(30) Foreign Application Priority Data

Apr. 14, 2016 (JP) ................................. 2016-081333
Feb. 13, 2017 (JP) ................................. 2017-023925

(51) Int. Cl.
G03G 15/00        (2006.01)
H04N 1/032        (2006.01)
(Continued)

(52) U.S. Cl.
CPC ......... *G03G 15/5037* (2013.01); *G03G 15/04* (2013.01); *H04N 1/032* (2013.01); *G03G 15/043* (2013.01); *G06K 15/12* (2013.01)

(58) Field of Classification Search
None
See application file for complete search history.

(56) References Cited

U.S. PATENT DOCUMENTS 5,398,099 A * 3/1995 Nagamochi ............ G03G 15/04
                                                        399/171
5,862,432 A * 1/1999 Nakayama ......... G03G 21/0005
                                                        399/129
(Continued)

FOREIGN PATENT DOCUMENTS

| JP | 2013-231936 | 11/2013 |
| JP | 2014-010383 | 1/2014 |
| JP | 2016-080826 | 5/2016 |

OTHER PUBLICATIONS

U.S. Appl. No. 15/427,735, filed Feb. 8, 2017.
U.S. Appl. No. 15/432,392, filed Feb. 14, 2017.

*Primary Examiner* — Thomas D Lee
(74) *Attorney, Agent, or Firm* — Oblon, McClelland, Maier & Neustadt, L.L.P.

(57) ABSTRACT

An image forming apparatus includes an image bearer, an image forming device to form a toner image on the image bearer with toner, a power source to output a bias to transfer the toner image onto a recording medium, and control circuitry. The circuitry controls the power source to decrease a peak-to-peak voltage of the bias in response to increase in at least one of temperature and humidity, when a time-averaged voltage of the bias is on a transfer side of transferring the toner to the recording medium, from a median value of maximum and minimum voltages of the bias. The circuitry controls the power source to increase the peak-to-
(Continued)

peak voltage of the bias in response to increase in at least one of temperature and humidity, when the time-averaged voltage of the bias is on a return side of returning the toner to the image bearer, from the median value.

16 Claims, 8 Drawing Sheets

(51) Int. Cl.
   *G03G 15/04* (2006.01)
   *G06K 15/12* (2006.01)
   *G03G 15/043* (2006.01)

(56) References Cited

U.S. PATENT DOCUMENTS

| | | | | |
|---|---|---|---|---|
| 9,042,751 B2* | 5/2015 | Okada | G03G 15/065 | 399/27 |
| 9,817,341 B2* | 11/2017 | Ohsugi | G03G 15/1665 | |
| 9,864,307 B2* | 1/2018 | Sengoku | G03G 15/1665 | |
| 2010/0008685 A1* | 1/2010 | Shibuya | G03G 15/0216 | 399/50 |
| 2010/0303518 A1* | 12/2010 | Aimoto | G03G 15/1605 | 399/314 |
| 2011/0229168 A1 | 9/2011 | Shiraishi et al. | | |
| 2012/0045231 A1 | 2/2012 | Ogino et al. | | |
| 2012/0045259 A1 | 2/2012 | Nakamura et al. | | |
| 2012/0230715 A1 | 9/2012 | Ogino et al. | | |
| 2012/0243892 A1 | 9/2012 | Nakamura et al. | | |
| 2012/0328314 A1 | 12/2012 | Sugimoto et al. | | |
| 2013/0004190 A1* | 1/2013 | Sengoku | G03G 15/0189 | 399/66 |
| 2013/0121714 A1 | 5/2013 | Tanaka et al. | | |
| 2013/0136468 A1 | 5/2013 | Shimizu et al. | | |
| 2013/0136477 A1 | 5/2013 | Ogiyama et al. | | |
| 2013/0142531 A1 | 6/2013 | Sugimoto et al. | | |
| 2013/0177328 A1* | 7/2013 | Fukuda | G03G 15/0266 | 399/43 |
| 2013/0308968 A1 | 11/2013 | Tanaka et al. | | |
| 2014/0010562 A1 | 1/2014 | Tanaka et al. | | |
| 2014/0029988 A1* | 1/2014 | Shimizu | G03G 15/1665 | 399/314 |
| 2014/0079418 A1 | 3/2014 | Tanaka et al. | | |
| 2015/0212453 A1 | 7/2015 | Tanaka | | |
| 2016/0109832 A1 | 4/2016 | Ohsugi et al. | | |
| 2016/0161887 A1 | 6/2016 | Sugiura et al. | | |
| 2016/0161888 A1 | 6/2016 | Wada et al. | | |
| 2016/0246218 A1 | 8/2016 | Tanaka | | |
| 2016/0334739 A1 | 11/2016 | Ohsugi et al. | | |
| 2017/0300000 A1* | 10/2017 | Nakamura | G03G 15/80 | |

\* cited by examiner

FIG.11D
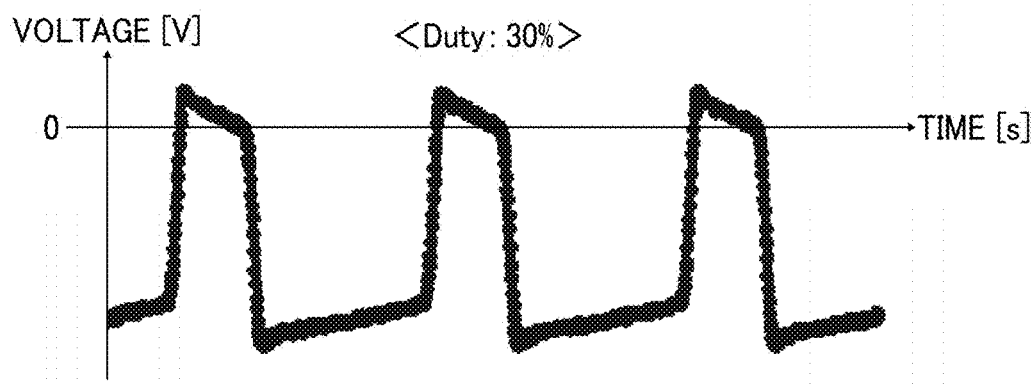
FIG.11E
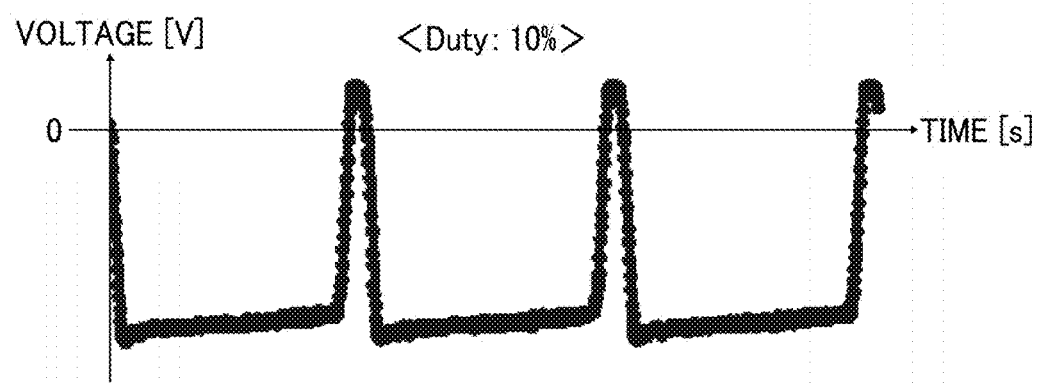
FIG.11F
| Duty [%] | 90 | 70 | 50 | 30 | 10 |
|---|---|---|---|---|---|
| GRADE | 4 | 4 | 3 | 1 | 1 |

IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2016-081333, filed on Apr. 14, 2016, and 2017-023925, filed on Feb. 13, 2017, in the Japan Patent Office, the entire disclosure of each of which is hereby incorporated by reference herein.

BACKGROUND

Technical Field

Embodiments of the present disclosure generally relate to an image forming apparatus for forming an image on a recording medium.

Related Art

Various types of electrophotographic image forming apparatuses are known, including copiers, printers, facsimile machines, and multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor as an image bearer. An optical scanner irradiates the surface of the photoconductor thus charged with a light beam to form an electrostatic latent image on the surface of the photoconductor according to the image data. A developing device supplies toner to the electrostatic latent image thus formed to render the electrostatic latent image visible as a toner image. The toner image is then transferred onto a recording medium either directly, or indirectly via an intermediate transfer belt. Finally, a fixing device applies heat and pressure to the recording medium bearing the toner image to fix the toner image onto the recording medium. Thus, the image is formed on the recording medium.

For example, such image forming apparatuses may primarily transfer the toner image from the photoconductor onto the intermediate transfer belt, and secondarily transfer the toner image from the intermediate transfer belt onto the recording medium at an area of contact between the intermediate transfer belt and a transfer roller through an electrostatic transfer process. In the electrostatic transfer process, a secondary transfer bias is applied to an opposed roller that contacts an inner circumferential surface of the intermediate transfer belt to sandwich the intermediate transfer belt with the transfer roller, thereby forming the area of contact between the intermediate transfer belt and the transfer roller. In order to enhance transferability of the toner image onto the recording medium P, for example, a superimposed bias may be used as the secondary transfer bias, in which an alternating current voltage is superimposed on a direct current voltage. The intermediate transfer belt may be constructed of a plurality of layers which includes, e.g., a base layer and a top layer resting on the base layer. The base layer may be an endless belt formed into a loop. The top layer has a greater elasticity than the elasticity of the base layer, and rests on an outer circumferential surface of the base layer.

Such an intermediate transfer belt may maintain a relatively high durability with the durability of the base layer while reliably transferring the toner image onto the recording medium, particularly onto a recording medium having a rough surface, with the elasticity of the top layer. The top layer of the intermediate transfer belt has an elasticity to adhere to recesses on the rough surface of the recording medium, helping reliable transfer of toner to the recesses.

SUMMARY

In one embodiment of the present disclosure, a novel image forming apparatus is described that includes an image bearer, an image forming device, a power source, and control circuitry. The image forming device forms a toner image on the image bearer with toner. The power source outputs a bias including an alternating current component to transfer the toner image onto a recording medium. The control circuitry controls the power source to decrease a peak-to-peak voltage of the bias in response to increase in at least one of temperature and humidity, when a time-averaged voltage of the bias is on a transfer side of transferring the toner from the image bearer to the recording medium, from a median value of a maximum voltage and a minimum voltage of the bias. The control circuitry also controls the power source to increase the peak-to-peak voltage of the bias in response to increase in at least one of temperature and humidity, when the time-averaged voltage of the bias is on a return side of returning the toner from the recording medium to the image bearer, from the median value of the maximum voltage and the minimum voltage of the bias.

BRIEF DESCRIPTION OF THE DRAWINGS

A more complete appreciation of the disclosure and many of the attendant advantages thereof will be more readily obtained as the same becomes better understood by reference to the following detailed description of embodiments when considered in connection with the accompanying drawings, wherein:

FIG. 11D is a waveform chart of an actual output waveform of the secondary transfer bias with a duty of 30%;

FIG. 11E is a waveform chart of an actual output waveform of the secondary transfer bias with a duty of 10%; and FIG. 11F is a table illustrating evaluation results of reproducibility of image density of test images printed with various rates of duties.

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
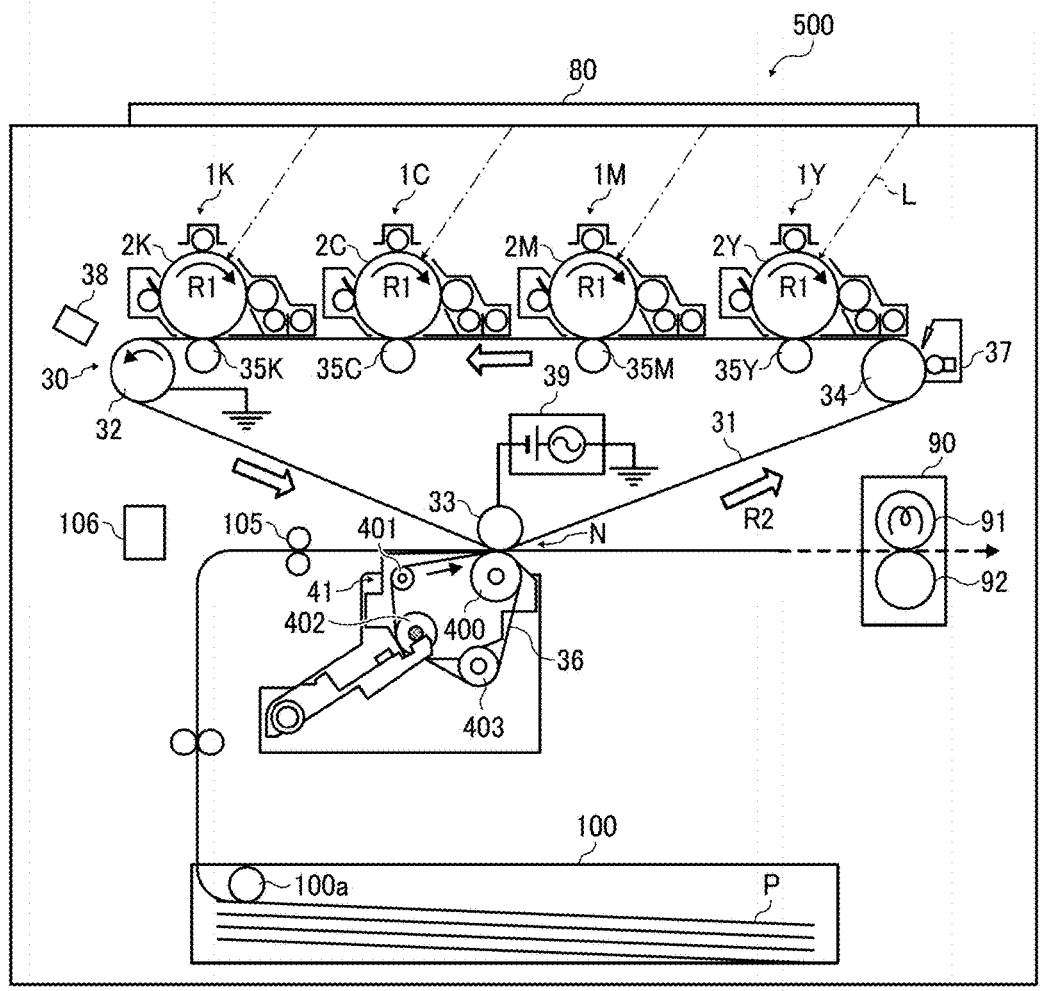
FIG. 1 is a schematic view of an image forming apparatus according to an embodiment of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

It is to be noted that, in the following description, suffixes Y, M, C, and K denote colors yellow, magenta, cyan, and black, respectively. To simplify the description, these suffixes are omitted unless necessary.

Referring now to the drawings, embodiments of the present disclosure are described below.

Figure 2:
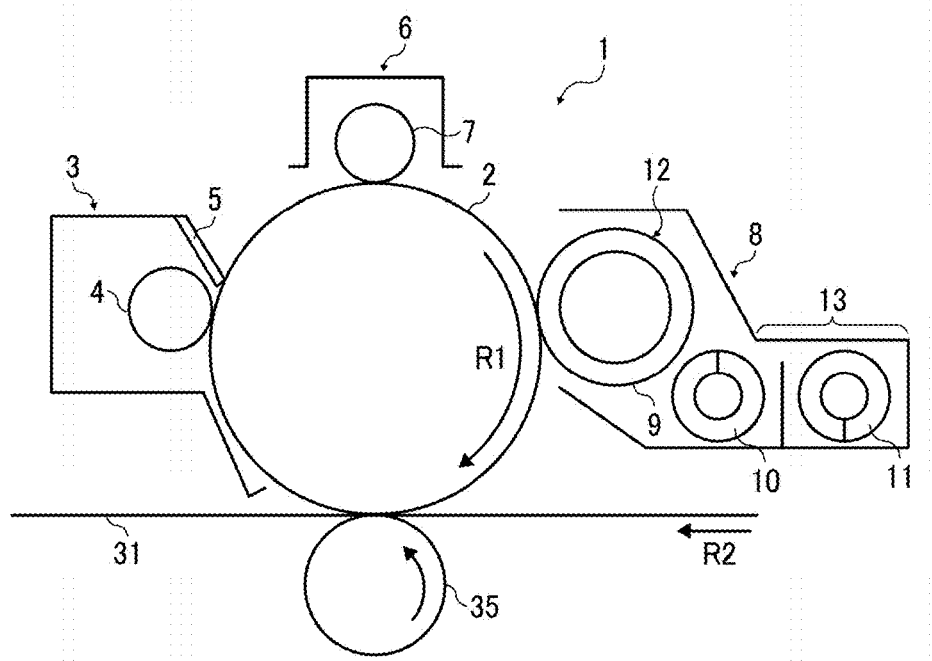
FIG. 2 is an enlarged view of an image forming device incorporated in the image forming apparatus of FIG. 1.

Initially with reference to FIGS. 1 and 2, a description is given of a configuration and operation of an image forming apparatus 500 according to an embodiment of the present disclosure.

FIG. 1 is a schematic view of the image forming apparatus 500. FIG. 2 is an enlarged view of an image forming device 1.

The image forming apparatus 500 may be a copier, a facsimile machine, a printer, a multifunction peripheral or multifunction printer (MFP) having at least one of copying, printing, scanning, facsimile, and plotter functions, or the like. According to the present embodiment, the image forming apparatus 500 is a color printer that forms color and monochrome toner images on a recording medium by electrophotography. Alternatively, the image forming apparatus 500 may be a monochrome printer that forms a monochrome toner image on a recording medium.

As illustrated in FIG. 1, the image forming apparatus 500 includes, e.g., four image forming devices 1Y, 1M, 1C, and 1K, a transfer device 30, a scanner 80, a fixing device 90, a sheet tray 100, and a registration roller pair 105. The four image forming devices 1Y, 1M, 1C, and 1K form toner images of yellow (Y), magenta (M), cyan (C), and black (K), respectively.

The image forming devices 1Y, 1M, 1C, and 1K has identical configurations, except that they employ different colors of toner as a powder-form developing agent. The image forming devices 1Y, 1M, 1C, and 1K are replaced upon completion of their product life. According to the present embodiment, the image terming devices 1Y, 1M, 1C, and 1K are removable from a housing of the image forming apparatus 500, thus being replaceable.

FIG. 2 is an enlarged view of one of the image forming devices 1Y, 1M, 1C, and 1K as a representative example. Since the image forming devices 1Y, 1M, 1C, and 1K have identical configurations, differing only in the color of toner employed, the description is provided without the suffixes Y, M, C, and K indicating colors unless differentiation of the color is necessary.

The image forming device 1 includes, e.g., a dram-shaped photoconductor 2 as a latent image bearer, a photoconductor cleaner 3, a discharger, a charger 6, and a developing device 8. These devices are held in a common casing all together, thereby constructing a process cartridge removable from the housing of the image forming apparatus 500. Thus, the image forming device 1 is replaceable independently.

The photoconductor 2 includes a drum-shaped base and an organic photosensitive layer resting on the surface of the drum-shaped base. A driver drives and rotates the photoconductor 2 in a clockwise direction of rotation R1 as illustrated in FIG. 1. The charger 6 includes a charging roller 7 to which a charging bias is applied. The charging roller 7 contacts or approaches the photoconductor 2 to generate an electrical discharge therebetween, thereby uniformly charging the surface of the photoconductor 2. Alternatively, instead of using the charging roller 7 that contacts or approaches the photoconductor 2, a corona charger or the like that does not contact the photoconductor 2 may be employed.

The scanner 80 is an optical writing device that irradiates the surface of the photoconductor 2 thus uniformly charged by the charging roller 7 with exposure light such as a laser beam L to form an electrostatic latent image on the surface of the photoconductor 2. The developing device 8 develops the electrostatic latent image thus formed on the photoconductor 2 with toner, rendering the electrostatic latent image visible as a toner image. The toner image thus formed on the photoconductor 2 is primarily transferred onto an intermediate transfer belt 31, which is an endless belt formed into a loop.

The photoconductor cleaner 3 removes residual toner, which has failed to be transferred onto the intermediate transfer belt 31 and therefore remaining on the photoconductor 2, from the photoconductor 2. The photoconductor cleaner 3 includes, e.g., a cleaning brush roller 4 driven to rotate and a cleaning blade 5 cantilevered. That is, tire cleaning blade 5 has one end fixed to a housing of the photoconductor cleaner 3 and the other end (i.e., free end) contacting the surface of the photoconductor 2. The cleaning brush roller 4 rotates and brushes off the residual toner from the surface of the photoconductor 2 while the cleaning blade 5 scraping off the residual toner from the surface of photoconductor 2.

After the photoconductor cleaner 3 cleans the surface of photoconductor cleaner 3, the discharger removes residual charge remaining on the surface of the photoconductor 2. Thus, the discharger discharges the surface of the photoconductor 2 to initialize a surface potential of the photoconductor 2, rendering the photoconductor 2 ready for a next image formation.

The developing device 8 includes a developing portion 12 and a developer conveyor 13. Inside the developing portion 12 is a developing roller 9 as a developer bearer. The developer conveyor 13 stirs and conveys developer. The developer conveyor 13 includes a first chamber that accommodates a first screw 10 and a second chamber that accommodates a second screw 11. Each of the first screw 10 and the second screw 11 is constructed of a rotational shaft and a helical flighting wrapped around a circumferential surface of the rotational shaft. The rotational shaft of each of the first screw 10 and the second screw 11 has opposed lateral ends in an axial direction thereof rotatably supported by shaft bearings.

A wall separates the first chamber that accommodates the first screw 10 and the second chamber that accommodates the second screw 11 from each other. Each lateral end of the wall in the axial direction of the first screw 10 and the second screw 11 has a connecting hole through which the first chamber and the second chamber communicate. The first screw 10 rotates and stirs the developer held in the helical flighting in a direction of rotation while conveying the developer from a distal end to a proximal end of the first screw 10 in a direction perpendicular to the surface of the paper on which FIG. 2 is drawn. The first screw 10 is disposed parallel to and facing the developing roller 9. The developer is conveyed axially along the developing roller 9. That is, the first screw 10 supplies the developer to the surface of the developing roller 9 axially along the developing roller 9.

Specifically, the developer is conveyed to a neighborhood of the proximal end of the first screw 10 in the direction perpendicular to the surface of the paper on which FIG. 2 is drawn. The developer then passes through the connecting hole provided at a proximal end of the wall in the direction perpendicular to the surface of the paper on which FIG. 2 is drawn. The developer enters the second chamber, where the developer is held in the helical flighting of the second screw 11. The second screw 11 rotates and stirs the developer in a direction of rotation while conveying the developer from the proximal end to the distal end of the second screw 11 in the direction perpendicular to the surface of the paper on which FIG. 2 is drawn.

In the second chamber is a toner density sensor to detect toner density. Specifically, the toner density sensor is disposed on a bottom wall of a casing of the second chamber. In the present embodiment, the toner density sensor is a magnetic permeability sensor. There is a correlation between the toner density and the magnetic permeability of the developer including toner panicles and magnetic carrier particles. Therefore, the magnetic permeability sensor can detect toner density.

Figure 7:
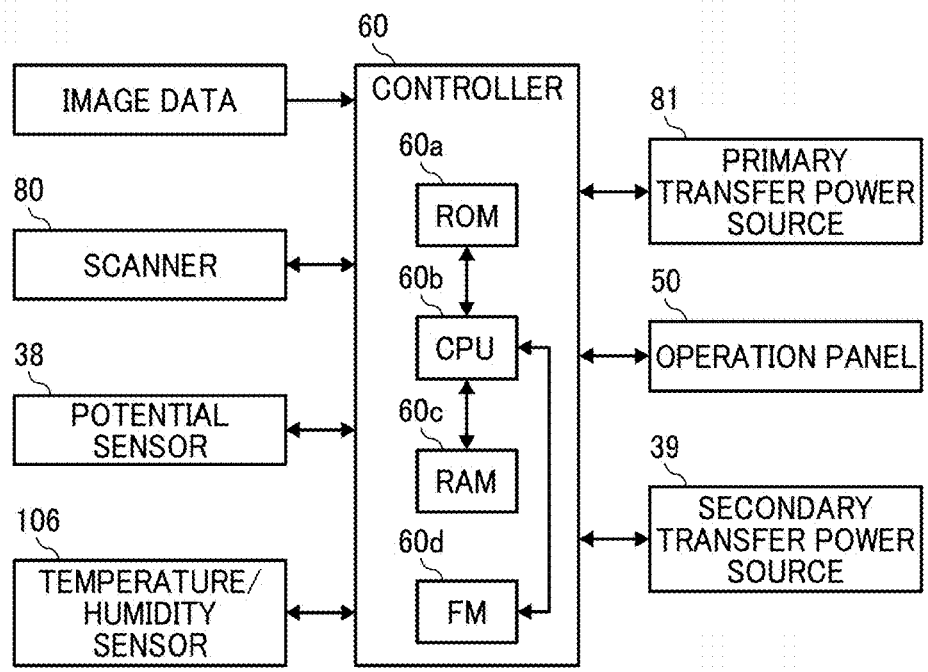
FIG. 7 is a block diagram of a control system of the image forming apparatus of FIG. 1.

The image forming apparatus 500 includes toner supply devices to independently supply toner of yellow, magenta, cyan, and black to the second chamber of the respective developing devices 8Y, 8M, 8C, and 8K. A controller 60 of the image forming apparatus 500 includes a random access memory (RAM) 60c, as illustrated in FIG. 7, to store a target output voltage Vtref of output voltage provided by the toner density sensor for each color of yellow, magenta, cyan, and black. If the difference between the output voltage provided by the toner density sensor and the target output voltage Vtref for each color of yellow, magenta, cyan, and black exceeds a given value, the toner supply device for each color of yellow, magenta, cyan, and black is driven to supply toner for a given period of time corresponding to the difference. Accordingly, the toner of yellow, magenta, cyan, and black is supplied to the second chamber of the respective developing devices 8.

As described above, the developing roller 9 accommodated in the developing portion 12 faces the first screw 10. The developing roller 9 also faces the photoconductor 2 through an opening formed in a casing of the developing device 8. The developing roller 9 includes a cylindrical developing sleeve and a magnetic roller. The developing sleeve is a non-magnetic pipe that is driven to rotate. The magnetic roller is fixed inside the developing sleeve so as not to rotate together with the developing sleeve. The developing roller 9 bears the developer supplied from the first screw 10 on the surface of the developing sleeve by a magnetic force of the magnetic roller. As the developing sleeve rotates, the developing roller 9 conveys the developer to a developing area facing the photoconductor 2.

The developing sleeve is supplied with a developing bias having a polarity identical to a polarity of toner. An absolute value of the developing bias is greater than an electric potential of the electrostatic latent image on the photoconductor 2. On the other hand, the absolute value of the developing bias is less than the surface potential of the photoconductor 2 that is uniformly charged. Such a developing bias generates a developing potential between the developing sleeve and the electrostatic latent image on the photoconductor 2. The developing potential electrostatically moves the toner (i.e., developer) from the developing sleeve to the electrostatic latent image on the photoconductor 2. By contrast, a non-developing potential is generated between the developing sleeve and a non-image formation area of the photoconductor 2. The non-developing potential moves the toner from the developing sleeve to the surface of the developing sleeve. The developing potential and the non-developing potential selectively move the toner from the developing sleeve to the electrostatic latent image formed on the photoconductor 2. Thus, the electrostatic latent image is developed into the toner image.

Specifically, the toner images of yellow, magenta, cyan, and black are formed on the photoconductors 2Y, 2C, 2M, and 2K in the image forming devices 1Y, 1M, 1C, and 1K illustrated in FIG. 1, respectively.

As illustrated in FIG. 1, above the image forming devices 1Y, 1M, 1C, and 1K is the scanner 80 as a latent image writer. According to image data received from an external device such as a personal computer, the scanner 80 irradiates the photoconductors 2Y, 2M, 2C, and 2K with the laser beam L projected from a laser diode as a light source of the scanner 80. Accordingly, the electrostatic latent image is formed on the surface of each of the photoconductors 2Y, 2M, 2C, and 2K.

In the scanner 80, a polygon motor drives and rotates a polygon mirror. The polygon mirror deflects the laser beam L projected from the laser diode in a main scanning direction. The laser beam L thus deflected strikes optical lenses and mirrors to reach the surface of the photoconductor 2. Thus, the scanner 80 irradiates the surface of the photoconductor 2 with the laser beam L. Alternatively, the scanner 80 may employ a light emitting diode (LED) array as the light source. The LED array includes a plurality of LEDs that projects light to the surface of the photoconductor 2. Thus, the scanner 80 may irradiate the surface of the photoconductor 2 with the light.

Below the image forming devices 1Y, 1M, 1C, and 1K is the transfer device 30. The transfer device 30 includes the intermediate transfer belt 31 as an image bearer. The intermediate transfer belt 31 is an endless belt entrained around a plurality of rollers and formed into a loop. The intermediate transfer belt 31 rotates in a counter-clockwise direction of rotation R2 as illustrated in FIG. 1. The transfer device 30 includes the plurality of rollers disposed inside the loop formed by the intermediate transfer belt 31, such as a drive roller 32, a secondary transfer opposed roller 33, a cleaning backup roller 34, and four primary transfer rollers 35Y, 35M, 35C, and 35K. The transfer device 30 is a belt unit that is removable from the housing of the image forming apparatus 500, thus being replaceable. Outside the loop formed by the intermediate transfer belt 31 are, e.g., a secondary transfer unit 41, a belt cleaner 37, and a potential sensor 38 as a detector. The secondary transfer unit 41 includes a secondary transfer belt 36 as an image bearer and also as a secondary transfer device. In addition, a temperature/humidity sensor 106 as an environment detector is disposed outside the loop formed by the intermediate transfer belt 31.

As described above, the intermediate transfer belt 31 is entrained around and supported by the plurality of rollers disposed inside the loop formed by the intermediate transfer belt 31, such as the drive roller 32, the secondary transfer opposed roller 33, the cleaning backup roller 34. and the four primary transfer rollers 35Y, 35M, 35C, and 35K. As a driver drives and rotates the drive roller 32 counterclockwise, the intermediate transfer belt 31 rotates in the counter-clockwise direction of rotation R2 as illustrated in FIG. 1 by friction therebetween. That is, the transfer device 30 conveys a toner image on the intermediate transfer belt 31 entrained around and supported by the plurality of rollers.

The four primary transfer rollers 35Y, 35M, 35C, and 35K sandwiches the intermediate transfer belt 31 together with the photoconductors 2Y, 2M, 2C, and 2K, forming contact areas herein referred to as primary transfer nips between an outer circumferential surface of the intermediate transfer belt 31 and the surface of the photoconductors 2Y, 2M, 2C, and 2K, respectively. Primary transfer power sources 81Y, 81M, 81C, and 81K (collectively illustrated as primary transfer power source 81 in FIG. 7) apply a primary transfer bias to the primary transfer rollers 35Y, 35M, 35C, and 35K, respectively. Accordingly, primary transfer electric fields are generated between the primary transfer rollers 35Y, 35M, 35C, and 35K and the toner images of yellow, magenta, cyan, and black formed on the surface of the photoconductors 2Y, 2M, 2C, and 2K, respectively.

For example, the toner image of yellow formed on the surface of the photoconductor 2Y enters the primary transfer nip for yellow as the photoconductor 2Y rotates. Subsequently, the toner image of yellow is primarily transferred from the photoconductor 2Y onto the intermediate transfer belt 31 by the transfer electric field and pressure applied at the primary transfer nip. The intermediate transfer belt 31 bearing the toner image of yellow passes through the primary transfer nips for magenta, cyan, and black subsequently. Specifically, the toner images of magenta, cyan, and black are superimposed one atop another on the toner image of yellow on the intermediate transfer belt 31 while being transferred thereto from the respective photoconductors 2M, 2C, and 2K. Thus, a composite toner image is formed on the surface of the intermediate transfer belt 31. In the present embodiment, as described above, the primary transfer rollers 35Y, 35M, 35C, and 35K are employed as primary transfer devices. Alternatively, a transfer charger or a transfer brush may be employed as the primary transfer device.

As described above, the secondary transfer unit 41 is disposed outside the loop of the intermediate transfer belt 31. The secondary transfer unit 41 sandwiches the intermediate transfer belt 31 together with the secondary transfer opposed roller 33 disposed inside the loop formed by the intermediate transfer belt 31, thereby forming an area of contact, herein referred to as a secondary transfer nip N, between the outer circumferential surface of the intermediate transfer belt 31 and an outer circumferential surface of the secondary transfer belt 36. Specifically, the secondary transfer unit 41 includes the secondary transfer belt 36 entrained around a plurality of rollers. One of the plurality of rollers is a secondary transfer roller 400 disposed opposite the secondary transfer opposed roller 33. The secondary transfer roller 400 sandwiches the intermediate transfer belt 31 and the secondary transfer belt 36 together with the secondary transfer opposed roller 33, thereby forming the secondary transfer nip N. The secondary transfer belt 36 is entrained around and supported by the secondary transfer roller 400 and other rollers 401, 402, and 403 as illustrated in FIG. 1. A secondary transfer power source 39 applies a secondary transfer bias to the secondary transfer opposed roller 33. By contrast, the secondary transfer belt 36 is grounded. Specifically, the secondary transfer roller 400 that supports the secondary transfer belt 36 is grounded. Accordingly, a secondary transfer electrical field is generated between the secondary transfer opposed roller 33 and the secondary transfer belt 36. The secondary transfer electric field electrostatically moves the toner having a negative polarity from the secondary transfer opposed roller 33 toward the secondary transfer belt 36.

In a lower portion of the housing of the image forming apparatus 500 is, e.g., a sheet feeding roller 100a and a sheet tray 100 that accommodates a plurality of recording media P such as paper sheets and resin sheets. The sheet feeding roller 100a contacts an uppermost recording medium P of the plurality of recording media P. The activation of the sheet feeding roller 100a is timed to pick up and feed the recording medium P toward a recording medium conveyance passage defined by internal components of the image forming apparatus 500. Along the recording medium conveyance passage is, e.g., a registration roller pair 105 that receives the recording medium P fed from the sheet tray 100. As soon as the registration roller pair 105 sandwiches the recording medium P between rollers thereof, the registration roller pair 105 stops rotating temporarily. The activation of the registration roller pair 105 is timed to convey the recording medium P to the secondary transfer nip N so that the recording medium P meets the composite toner image formed on the intermediate transfer belt 31 at the secondary transfer nip N.

As described above, the transfer device 30 is a belt unit that includes the intermediate transfer belt 31 entrained around and supported by the plurality of rollers such as the drive roller 32, the secondary transfer opposed roller 33, and the cleaning backup roller 34. The intermediate transfer belt 31 is an endless belt as an image bearer onto which a loner image is transferred from the photoconductor 2. The intermediate transfer belt 31 bears and conveys the toner image to the secondary transfer nip N so that the toner image is transferred onto the recording medium P from the intermediate transfer bell 31 at the secondary transfer nip N. Thus, the transfer device 30 conveys the toner image to the secondary transfer nip N.

At the secondary transfer nip N, the toner images of yellow, magenta, cyan and black constructing the composite loner image adhere to the recording medium P, thus being collectively transferred onto the recording medium P by the secondary transfer electrical field and pressure applied at the secondary transfer nip N. As a consequence, a full-color toner image is formed on the recording medium P in combination with white color of the recording medium P.

As described above, in the present embodiment, the secondary transfer bolt 36 functions as a nip forming device that contacts the intermediate transfer belt 31 to form the secondary transfer nip N therebetween. Alternatively, a nip forming roller may be employed as the nip forming device that contacts the intermediate transfer belt 31 to form the secondary transfer nip N.

After the composite toner image is transferred onto the recording medium P at the secondary transfer nip N, residual toner that has failed to be transferred onto the recording medium P may remain on the intermediate transfer belt 31. The belt cleaner 37 contacts the outer circumferential surface of the intermediate transfer belt 31 and removes such residual toner from the intermediate transfer belt 31. The cleaning backup roller 34 disposed inside the loop formed by the intermediate transfer belt 31 supports the belt cleaner 37 to clean the intermediate transfer belt 31.

As described above, the potential sensor 38 is disposed outside the loop formed by the intermediate transfer belt 31. Specifically, the potential sensor 38 is disposed opposite a portion of an entire circumferential area of the intermediate transfer belt 31 wound around the drive roller 32, with a predetermined gap between the potential sensor 38 and the intermediate transfer belt 31. The potential sensor 38 measures a surface potential of the toner image primarily transferred onto the intermediate transfer belt 31 when the toner image comes into an area where the potential senor 38 faces the toner image.

The fixing device 90 is disposed on the right hand side of the secondary transfer nip N in FIG. 1. The fixing device 90 receives the recording medium P bearing the full-color toner image. The fixing device 90 includes a fixing roller 91 and a pressure roller 92. A heater is disposed inside the fixing roller 91. The recording medium P is conveyed through an area of contact, herein referred to as a fixing nip, between the fixing roller 91 and the pressure roller 92. Under heat and pressure at the fixing nip, the toner contained in the full-color toner image melts and fixed onto the recording medium P. Thus, the full-color toner image is fixed onto the recording medium P. Thereafter, the recording medium P is output from the fixing device 90. The recording medium P bearing the fixed toner image is conveyed along a post-fixing recording medium conveyance passage and finally ejected from the housing of the image forming apparatus 500.

When the image forming apparatus 500 forms a monochrome image, in the transfer device 30, a support plate supporting the primary transfer rollers 35Y, 35M, and 35C is moved to separate the primary transfer rollers 35Y, 35M, and 35C from the photoconductors 2Y, 2M, and 2C, respectively. That is, the outer circumferential surface of the intermediate transfer belt 31 is separated from photoconductors 2Y, 2M, and 2C to contact the photoconductor 2K only. In this state, only the image forming device 1K is activated among the four image forming devices 1Y, 1M, 1C and 1K to form the toner image of black on photoconductor 2K.

In the present embodiment, the secondary transfer belt 36 functions as the secondary transfer device that forms the secondary transfer nip N between the intermediate transfer belt 31 and the secondary transfer belt 36. Alternatively, the secondary transfer roller 400 may function as the secondary transfer device that forms the secondary transfer nip N between the intermediate transfer belt 31 and the secondary transfer roller 400. In the present embodiment, the second-ary transfer power source 39 applies the secondary transfer bias to the secondary transfer opposed roller 33 inside the loop formed by the intermediate transfer belt 31. Alternatively, the secondary transfer power source 39 may apply the secondary transfer bias to the secondary transfer device (e.g., secondary transfer roller 400) outside the loop formed by the intermediate transfer belt 31. The embodiments of the present disclosure may be applied not only to a color image forming apparatus (e.g., image forming apparatus 500) to form a color image, but also to a monochrome image forming apparatus that forms a monochrome image.

Figure 3:
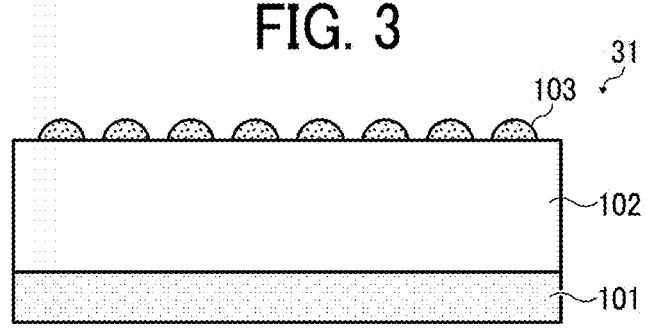
FIG. 3 is a schematic view of an intermediate transfer belt incorporated in the image forming apparatus of FIG. 1, illustrating a layer composition thereof.
Figure 4:
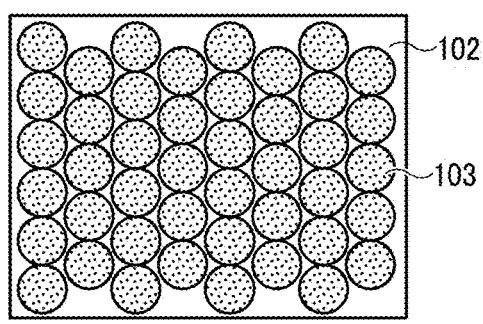
FIG. 4 is a schematic view of the intermediate transfer belt of FIG. 3, illustrating an outer circumferential surface thereof.

Referring now to FIGS. 3 and 4, a description is given of the intermediate transfer belt 31.

FIG. 3 is a schematic view of the intermediate transfer belt 31, illustrating a layer composition thereof. FIG. 4 is a schematic view of the intermediate transfer belt 31, illustrating the outer circumferential surface thereof.

It is to be noted that the configuration of the intermediate transfer belt 31 is not limited to the configuration described below.

In the present embodiment, the intermediate transfer belt 31 includes a base layer 101 and an elastic layer 102 resting on the base layer 101. The base layer 101 is an endless belt made of a material having a certain flexibility and an increased rigidity. The elastic layer 102 is made of an elastic material having enhanced softness. Particles 103 are dispersed in the elastic layer 102. Each of the particles 103 has a portion projecting from the surface of the elastic layer 102 while being densely arranged in a belt surface direction as illustrated in FIG. 4. These particles 103 form a rough surface of the intermediate transfer belt 31.

Now, a detailed description is given of the base layer 101.

The base layer 101 is made of, e.g., resin including an electrical resistance adjusting material such as a filler or an additive that adjusts the electrical resistance. In order to enhance noncombustibility, preferably, the resin is a fluorine-based resin, such as polyvinylidene fluoride (PVDF) or ethylenetetrafluoroethylene (ETFE), a polyimide resin, a polyamide-imide resin, or the like. Particularly, the polyimide resin or the polyamide-imide resin is preferable to enhance mechanical strength while providing good elasticity and heat resistance.

The electrical resistance adjusting material dispersed in the resin is, e.g., a metal oxide, a carbon black, an ion conductive material, or a conductive polymer material. The metal oxide is, e.g., zinc oxide, tin oxide, titanium oxide, zirconium oxide, aluminum oxide, or silicon oxide. In order to enhance dispersiveness, surface treatment may be applied to the metal oxide in advance. The carbon black is, e.g., ketjen black, furnace black, acetylene black, thermal black, or gas black. The ion conductive material is, e.g., tetraalkylammonium salt, trialkyl benzyl ammonium salt, alkylsulfonate, alkylbenzene sulfonate, alkylsulfate, glycerol fatty acid ester, sorbitan fatty acid ester, polyoxyethylene alkylamine, polyoxyethylene fatty acid alcohol ester, alkylbetaine, or lithium perchlorate. Alternatively, two or more of these ion conductive materials may be mixed. It is to be noted that the electrical resistance adjusting material of the base layer 101 is not limited to the materials described above.

Optionally, a dispersion auxiliary agent, a reinforcing material, a lubricant, a heat conduction material, an antioxidant, and the like may be added to a coating liquid as a precursor of the base layer 101. The coating liquid is a liquid resin in which the electrical resistance adjusting material is dispersed before curing. Preferably, an amount of the electrical resistance adjusting material included in the base layer 101 of a seamless belt, i.e., the intermediate transfer belt 31, is in a range of from $1\times10^8$ Ω/sq to $1\times10^{13}$ Ω/sq in surface resistivity, and in a range of from $1\times10^6$ Ω·cm to $10^{12}$ Ω·cm in volume resistivity. The amount of the electrical resistance adjusting material is determined to enhance mechanical strength, such that the formed film is not fragile and broken easily. That is, the intermediate transfer belt 31 is preferably a seamless belt with well-balanced mechanical strength and electrical characteristics (i.e., the surface resistivity and the volume resistivity) manufactured by use of the coating liquid having a properly adjusted blending proportion between the resin component (e.g., a polyimide resin precursor or a polyamide-imide resin precursor) and the electrical resistance adjusting material. If the electrical resistance adjusting material is carbon black, the amount of the electrical resistance adjusting material contained in the coating liquid is in a range of preferably from 10% to 25% by weight, and more preferably from 15% to 20% by weight, relative to all solid components of the coating liquid. If the electrical resistance adjusting material is a metal oxide, the amount of the electrical resistance adjusting material contained in the coating liquid is preferably from 1% to 50% by weight, and more preferably from 10% to 30% by weight, relative to all the solid components of the coating liquid. If an amount of the electrical resistance adjusting material less than the range described above is contained in the coating liquid, a desired effect may not be achieved. By contrast, if an amount of the electrical resistance adjusting material greater than the above-described range is contained in the coating liquid, the mechanical strength of the seamless belt (i.e., intermediate transfer belt 31) may significantly decrease, which is undesirable in actual use.

The thickness of the base layer 101 is not limited to a particular thickness. The thickness of the base layer 101 may be determined in a proper range. Preferably, the base layer 101 may have a thickness in a range of from 30 µm to 150 µm. More preferably, the base layer 101 may have a thickness of from 40 µm to 120 µm, and even more preferably from 50 µm to 80 µm. If the thickness of the base layer 101 is less than 30 µm, the base layer 101 may crack, which may tear the intermediate transfer belt 31. By contrast, if the thickness of the base layer is greater than 150 µm, the intermediate transfer belt 31 may be broken when it is bent. By contrast, the base layer 101 having a thickness in the range of from 50 µm to 80 µm described above enhances durability.

In order to increase a traveling stability of the intermediate transfer belt 31, the base layer 101 preferably has a uniform thickness. Adjusting the thickness of the base layer 101 is not limited to a particular way. The thickness of the base layer 101 may be properly adjusted in a selected way. For example, a contact-type thickness meter or an eddy-current thickness meter may be used to measure the thickness of the base layer 101. Alternatively, a scanning electron microscope (SEM) may be used to measure a cross-section of film, in this case, the base layer 101.

Now, a detailed description is given of the elastic layer 102.

As described above, the elastic layer 102 of the intermediate transfer belt 31 has a rough surface formed with the particles 103 dispersed in the elastic layer 102. The elastic layer 102 is made of an elastic material such as general resin, elastomer, and rubber, in particular, an elastic material having good softness (i.e., elasticity) is preferable for the elastic layer 102, such as an elastomer material and a rubber material. The elastomer material is, e.g., polyester, polyamide, polyether, polyurethane, polyolefin, polystyrene, poly acrylic, polydien, or silicone-modified polycarbonate. Alternatively, the elastomer material may be thermoplastic elastomer such as fluorine-based copolymer thermoplastic elastomer. Thermosetting resin is, e.g., polyurethane resin, silicone-modified epoxy resin, or silicone modified acrylic resin. The rubber material is, e.g., isoprene rubber, styrene rubber, butadiene rubber, nitrile rubber, ethylene-propylene rubber, butyl rubber, silicone rubber, chloroprene rubber, acrylic rubber, chlorosulfonated polyethylene, fluorocarbon rubber, urethane rubber, or hydrin rubber. A material having desired characteristics can be selected from the materials described above. In particular, a soft material is preferable to conform a rough surface of the recording medium such as Leathac (registered trademark) . The thermosetting material is preferable to the thermoplastic material for the elastic layer 102 to disperse the particles 103 therein. The thermosetting material has a good adhesion property relative to resin particles due to an effect of a functional group contributing to the curing reaction. In short, the elastic layer 102 made of the thermosetting material reliably fixes the particles 103 therein. For the same reason, vulcanized rubber is also preferable.

Acrylic rubber is most preferable for the elastic layer 102 among the elastic materials described above to enhance ozone resistance, softness, adhesion properties relative to the particles, application of noncombustibility, environmental stability, and the like. The acrylic rubber is not limited to a specific product. Commercially-available acrylic rubber can be used for the elastic layer 102. Among cross-linking types (e.g., epoxy group, active chlorine group, carboxyl group) of the acrylic rubber, the carboxyl group cross-linking type is preferable to enhance rubber physical properties, particularly the compression set, and workability. An amine compound is preferable as a cross-linker used for the acrylic rubber of carboxyl group cross-linking type. A multi valent amine compound is more preferable as the cross-linker for the acrylic rubber of carboxyl group cross-linking type. The cross-linker of amine compound is, e.g., aliphatic multivalent amine cross-linker or aromatic multivalent amine cross-linker. The aliphatic multivalent amine cross-linker is, e.g., hexamethylenediamine, hexamethylenediamine carbamate, or N,N'-dicinnamylidene-1,6-hexanediamine. The aromatic multivalent amine cross-linker is, e.g., 4,4'-methylenedianiline, m-phenylenediamine, 4,4'-diaminodiphenyl ether, 3,4'-diaminodiphenyl ether, 4,4'-(m-phenylenediisopropylidene) dianiline, 4,4'-(p-phenylenediisopropylidene) dianiline, 2,2'-bis [4-(4-aminophenoxy)phenyl]propane, 4,4'-diaminobenzanilide, 4,4'-bis(4-aminophenoxy)biphenyl, m-xylylenediamine, p-xylylenediamine, 1,3,5-benzenetriamine, or 1,3,5-benzenetriaminomethyl.

The amount of the cross-linker is preferably from 0.05 parts by weight to 20 parts by weight, and more preferably from 0.1 parts by weight to 5 parts by weight, relative to 100 parts by weight of the acrylic rubber. An insufficient amount of cross-linker causes failure in cross-linking, hampering efforts to maintain the shape of the cross-linked product. By contrast, an excessive amount of cross-linker hardens the cross-linked product excessively, degrading elasticity as a cross-linking rubber.

To enhance a cross-linking reaction, a cross-linking promoter may be mixed in the acrylic rubber employed for the elastic layer 102. The cross-linking promoter is not limited to a particular type. However, the cross-linking promoter may be preferably used in combination with the multivalent amine cross-linker described above. The cross-linking promoter is, e.g., a guanidino compound, an imidazole compound, a quaternary onium salt, a tertiary phosphine compound, or a weak acid alkali metal salt. The guanidino compound is, e.g., 1,3-diphenylguanidine or 1,3-di-o-tolyguanidine. The imidazole compound is, e.g., 2-methylimidazole or 2-phenyl imidazole. The quaternary onium salt is, e.g., tetra-n-butylammonium bromide or octadecyltri-n-butylammonium bromide. The multivalent tertiary amine compound is, e.g., triethylenediamine or 1,8-diazabicyclo [5.4.0]undec-7-ene (DBU). The tertiary phosphine compound is, e.g., triphenylphosphine or tri(p-tolyl)phosphine. The weak acid alkali metal salt is, e.g., phosphate such as sodium and potassium, an inorganic weak acid salt such as carbonate, or an organic weak acid salt such as stearate and laurate.

The amount of the cross-linking promoter is preferably from 0.1 parts by weight to 20 parts by weight, and more preferably from 0.3 parts by weight to 10 parts by weight, relative to 100 parts by weight of the acrylic rubber. An excessive amount of cross linking promoter may accelerate cross-linking, cause the cross-linking promoter to bloom on the surface of the cross-linked product, or harden the cross-linked product. By contrast, an insufficient amount of cross-linker may significantly decrease the tensile strength of the cross-linked product or significantly change the elongation or tensile strength of the cross-linked product after being heated.

The acrylic rubber may be prepared through an appropriate mixing procedure such as roll mixing, Banbury mixing, screw mixing, and solution mixing. The mixing order is not limited to a particular order. Preferably, ingredients that hardly react with heat or that are hardly decomposed by heat are thoroughly mixed first, and then ingredients (e.g., cross-linker) that easily react with heat or that are easily decomposed by heat are mixed together in a short period of time at a temperature at which reaction or decomposition does not occur.

When heated, the acrylic rubber serves as a cross-linked product. A cross-linking temperature to heat the acrylic rubber is preferably from 130° C. to 220° C., and more preferably from 140° C. to 200° C. A preferable period of time for a cross-linking operation is in a range of from 30 seconds to 5 hours. A heating method to heat the acrylic rubber may be chosen from general methods used to cross-link rubber, such as press heating, steam heating, oven heating, and hot-air heating. In order to reliably cross-link the inside of the cross-linked product, a post or second cross-linking operation may be optionally performed after a first cross-linking operation. The period of time for the post cross-linking operation depends on the heating method, the cross-linking temperature, and the shape of the cross-linked product. Preferably, the period of time for the post cross-linking operation is from 1 hour to 48 hours. The heating method and the heating temperature for the post cross-linking operation may be chosen as appropriate. The electrical resistance adjusting agent and the flame retardant may be included in the selected materials to adjust electrical characteristics and to enhance noncombustibility, respectively. Optionally, materials such as an antioxidant, a reinforcing agent, a filler, and a cross-linking promoter may be added to the selected materials. The electrical resistance adjusting agent to adjust electrical resistance can be selected from the materials described above. However, a minimal amount of the carbon black and the metal oxide may be used so as not to impair softness. Use of the ion conductive material or the conductive high polymer is effective. Alternatively, these materials can be used in combination.

Preferably, various types of perchlorates and ionic liquids are added in an amount of from 0.01 parts by weight to 3 parts by weight relative to 100 parts by weight of rubber. The ion conductive material in an amount of 0.01 parts by weight or less is insufficient to reduce resistivity. By contrast, the ion conductive material in an amount of 3 parts by weight or more may possibly cause the conductive material to bloom or bleed on the surface of the intermediate transfer belt 31.

The amount of the electrical resistance adjusting material is preferably adjusted such that the elastic layer 102 has a surface resistivity of from $1\times10^8$ Ω/sq to $1\times10^{13}$ Ω/sq and a volume resistivity of from $1\times10^6$ Ω·cm to $1\times10^{12}$ Ω·cm. In order to enhance transferability of toner onto a rough surface of a recording medium as is desired in recent electrophotographic image forming apparatuses, the elasticity of the elastic layer 102 is preferably adjusted to have a micro rubber hardness of 35 or less at a temperature of 23° C. with a relative humidity (RH) of 50%. In measurement of microhardness with, e.g., Martens and Vickers hardness test methods, the hardness of a shallow area of a measurement target in a bulk direction thereof is measured. In other words, the hardness of only a limited area near the surface is measured. That is, deformability of the entire intermediate transfer belt 31 may not be evaluated. For example, if a soft material is used for the top layer of an intermediate transfer belt having a relatively low deformability as a whole, the microhardness may decrease as a consequence. Such an intermediate transfer belt having a relatively low deformability does not reliably conform to the rough surface of the recording medium. As a consequence, the intermediate transfer belt impairs the transferability of toner onto the rough surface of the recording medium, which is desired in recent electrophotographic image forming apparatuses. To address this circumstance, the micro rubber hardness of the intermediate transfer belt 31 is measured to evaluate the deformability or elasticity of the entire intermediate transfer belt 31.

The elastic layer 102 has a thickness of preferably from 200 μm to 2 mm, and more preferably from 400 μm to 1000 μm. If the thickness of the elastic layer 102 is less than 200 μm, the elastic layer 102 may not reliably confirm to the rough surface of the recording medium, hampering effective reduction of transfer pressure. By contrast, if the thickness of the elastic layer 102 is greater than 2 mm, the elastic layer 102 may be deformed by its own weight. As a consequence, the intermediate transfer belt 31 may unstably rotate or may be damaged as is entrained around the plurality of rollers. In order to measure the thickness of the elastic layer 102, for example, the scanning electron microscope (SEM) may be used. The SEM observes the cross-section of the elastic layer 102, thereby measuring the thickness of the elastic layer 102.

Now, a description is given of the particles 103.

As described above, the particles 103 are dispersed in the elastic material of the classic layer 102. The particles 103 are spherical resin particles having an average particle diameter of 100 μm or less and insoluble in an organic solvent. 3% pyrolysis temperature of the resin particles is 200° C. or higher. The resin material of the particles 103 is not limited to a particular resin material. The particles 103 may be. e.g., acrylic resins, melamine resins, polyamide resins, polyester resins, silicone resins, fluorocarbon resins, or rubbers. Optionally, the surface of mother particles made of such a resin material may be treated with a different kind of material. For example, the surface of the spherical mother particles made of robber may be coated with a hard resin. The mother particles may be hollow or porous, for example.

Among the resin materials described above, silicone resin particles are most preferable as the particles 103 to enhance slidability and abrasion resistance and to facilitate toner separation from the surface of the intermediate transfer belt 31. The particles 103 are shaped like a sphere through a polymerization process, for example. The more spherical the particles are, the more preferred for the particles 103. Preferably, the particles 103 are mono-disperse particles having a volume average particle diameter of from 1.0 μm to 5.0 μm. The mono-disperse particles are not particles having a common particle diameter, but are particles having a quite sharp particle size distribution. Specifically, the particles have a distribution width equal to or less than± (average particle diameter×0.5 μm). If the particle diameter of the particles 103 is less than 1.0 μm, the particles 103 may not sufficiently enhance transferability of toner. By contrast, if the particle diameter of the particles 103 is greater than 5.0 μm, the space between the particles 103 increases. That is, the surface roughness of the intermediate transfer belt 31 increases, resulting in unreliable transfer of toner. In addition, the intermediate transfer belt 31 may be insufficiently cleaned. Particles made of a resin material generally have a relatively high insulation property. Therefore, if the particles 103 have an excessive particle diameter, accumulation of electrical charge of the particles 103 may often trigger imaging failure during continuous print jobs.

The particles 103 may be either commercially-available particles or laboratory-derived particles. The particles 103 thus obtained are directly applied to the elastic layer 102 and leveled thereon, facilitating a uniform arrangement of the particles 103. In addition, the particles 103 are substantially prevented from being overlapped in a thickness direction of the intermediate transfer belt 31. Preferably, the cross-sectional diameter of the particles 103 in a surface direction of the elastic layer 102 is as uniform as possible. Specifically, a preferable distribution width of the cross-sectional diameter of the particles 103 is equal to or less than± (average particle diameter×0.5 μm). For this reason, powder including particles with a small particle diameter distribution is preferably used as the particles 103. Alternatively, powder including particles having a relatively large particle diameter distribution may be used as the particles 103 provided that particles having a specific particle diameter are selectively applied to the surface of the elastic layer 102. It is to be noted that the particles 103 are applied to the surface of the elastic layer 102 not at a particular time. The particles 103 may be applied to the surface of the elastic layer 102 before or after the elastic material of the elastic layer 102 is cross-linked.

With respect to a projected area ratio of a portion of the elastic layer 102 where the particles 103 exist relative to a portion of the elastic layer 102 where the surface of the elastic layer 102 is exposed in the surface direction of the elastic layer 102 in which the particles 103 are dispersed, a projected area rate of the portion of the elastic layer 102 where the particles 103 exist is preferably 60% or higher. If the projected area rate of the portion of the elastic layer 102 where the particles 103 exist is less than 60%, the toner and a pure surface of the elastic layer 102 may often contact directly with each other. As a consequence, for example, the toner may be unreliably transferred, the toner may be insufficiently removed from the surface of the intermediate transfer belt 31, and a filming resistance of the surface of the intermediate transfer belt 31 may decrease. In some embodiments, a belt without the particles 103 dispersed in the elastic layer 102 may be used as the intermediate transfer belt 31.

Figure 5:
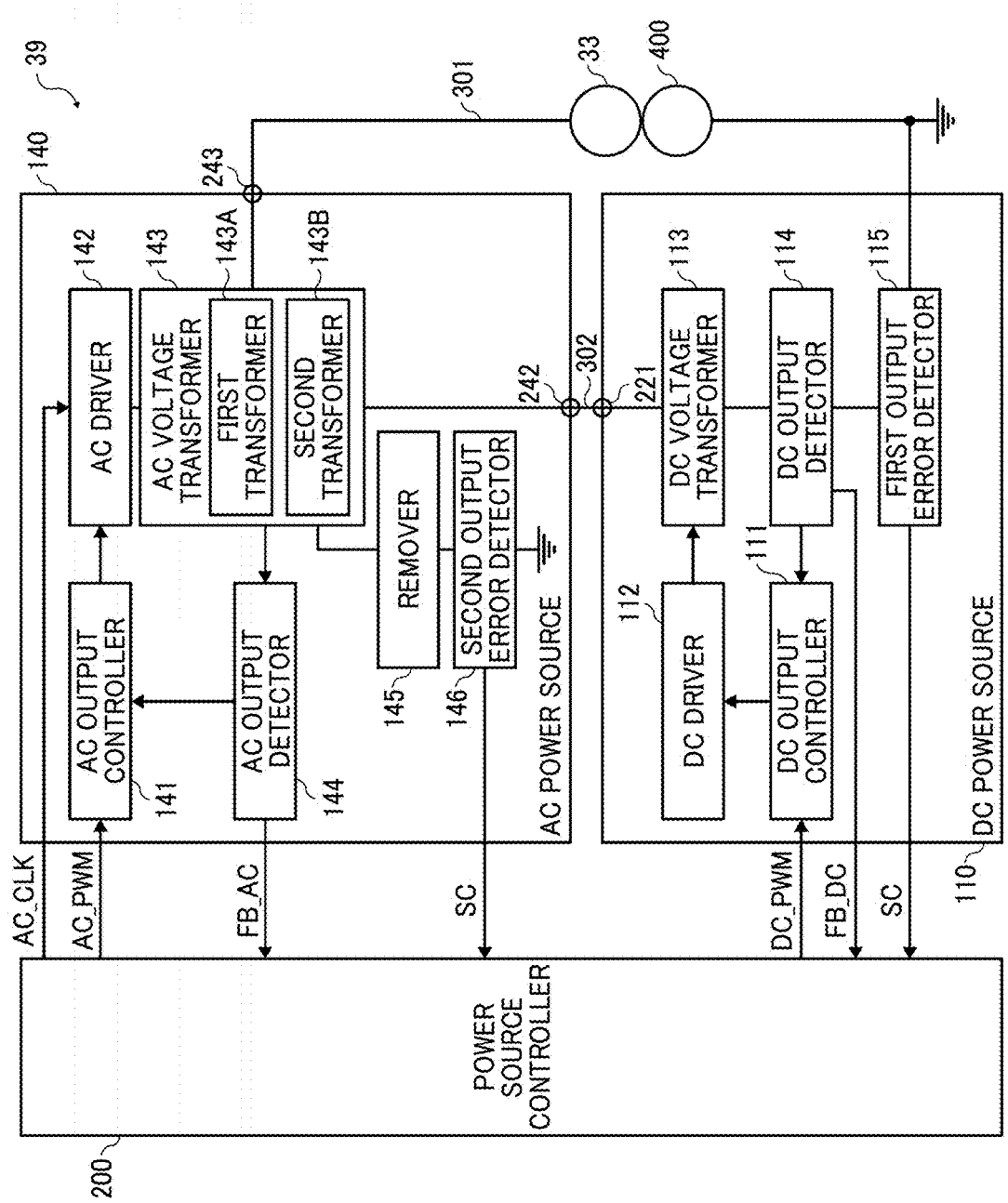
FIG. 5 is a block diagram illustrating a main part of an electrical circuit of a secondary transfer power source incorporated in the image forming apparatus of FIG. 1.

FIG. 5 is a block diagram illustrating a main part of an electrical circuit of the secondary transfer power source 39.

As illustrated in FIG. 5, the secondary transfer power source 39 includes, e.g., a direct current (DC) power source 110, an alternating current (AC) power source 140, and a power source controller 200. The DC power source 110 outputs a DC voltage to apply an electrostatic force to loner on the intermediate transfer belt 31 so that the toner moves from the intermediate transfer belt 31 to the recording medium F in the secondary transfer nip N. The DC power source 110 includes a DC output controller 111, a DC driver 112, a DC voltage transformer 113, a DC output detector 114, a first output error detector 115, and an electrical connector 221.

The AC power source 140 outputs an AC voltage to form an alternating electric field in the secondary transfer nip N. The AC power source 140 includes an AC output controller 141, an AC driver 142, an AC voltage transformer 143, an AC output detector 144, a remover 145, a second output error detector 146, and electrical connectors 242 and 243.

In the present embodiment, the AC voltage transformer 143 includes two transformers that output AC voltages with different duties, namely, a first transformer 143A and a second transformer 143B. The duty of the AC voltage output from one of the first transformer 143A and the second transformer 143B is greater than the duty of the AC voltage output from the other one of the first transformer 143A and the second transformer 143B. A detailed description of the duty is deferred.

In the present example, the first transformer 143A outputs AC voltage with a low duty D1 while the second transformer 143B output AC voltage with a high duty D2. Specifically, the duty D1 of the AC voltage output from the first transformer 143A is lower than the duty D2 of the AC voltage output from the second transformer 143B. More specifically, for example, the first transformer 143A outputs AC voltage with the duty D1 equal to or less than 50%. On the other hand, the second transformer 143B outputs AC voltage with the duty D2 greater than 50%.

Alternatively, the AC voltage transformer 143 may be a single AC voltage transformer that does not include the two transformers 143A and 143B with a single circuit, provided that the power source controller 200 outputs a signal to switch a duty cycle.

The power source controller 200 controls the DC power source 110 and the AC power source 140. The power source controller 200 is, e.g., a processor or control circuitry that includes a central processing unit (CPU) provided with, e.g., a read only memory (ROM), and a random access memory (RAM). The power source controller 200 outputs a direct-current pulse width modulation (DC_PWM) signal to the DC output controller 111 to control an output level of the DC voltage, in addition to the DC_PWM signal, the DC output controller 111 receives an output value of the DC voltage transformer 113 detected by the DC output detector 114. Based on a duty cycle of the DC_PWM signal and the output value of the DC voltage transformer 113 thus input, the DC output controller 111 controls the driving of the DC voltage transformer 113 via the DC driver 112 to adjust the output value of the DC voltage transformer 113 to an output value instructed through the DC_PWM signal.

The DC driver 112 drives the DC voltage transformer 113 in accordance with an instruction from the DC output controller 111. The DC voltage transformer 113 thus driven by the DC driver 112 outputs a high DC voltage having a negative polarity.

The DC output detector 114 detects an output value of the high DC voltage from the DC voltage transformer 113 and outputs the output value of the high DC voltage to the DC output controller 111. On the other hand, the DC output detector 114 outputs the output value of the high DC voltage thus detected to the power source controller 200 as a feedback direct current (FB_DC) signal so that the power source controller 200 controls the duty of the DC_PWM signal to prevent decrease in transferability due to the environment and load. In the present embodiment, the DC power source HO is under constant-current control. Alternatively, the DC power source 110 may be under constant-voltage control.

The first output error detector 115 is disposed on an output line of the DC power source 110. When an output error occurs due to a ground fault or other problems in an electrical system, the first output error detector 115 outputs a serviceman call (SC) signal to the power source controller 200 to indicate an output error such as leakage. Accordingly, the power source controller 200 stops the DC power source 110 from outputting the high DC voltage.

The power source controller 200 also outputs an alternating-current pulse width modulation (AC_PWM) signal to the AC output controller 141 to control an output level of the AC voltage. In addition to the AC_PWM signal, the AC output controller 141 receives an output value of the AC voltage transformer 143 detected by the AC output detector 144. Based on a duty cycle of the AC_PWM signal and the output value of the AC voltage transformer 143 thus input, the AC output controller 141 controls the driving of the AC voltage transformer 143 via the AC driver 142 to adjust the output value of the AC voltage transformer 143 to an output value instructed through the AC_PWM signal.

The power source controller 200 also outputs an alternating-current clock (AC_CLK) signal to the AC driver 142 to control an output frequency of the AC voltage. The AC driver 142 drives the AC voltage transformer 143 according to an instruction from the AC output controller 141 and the $AC_{13}$ CLK signal. As the AC driver 142 drives the AC voltage transformer 143 according to the AC_CLK signal, an output waveform generated by the AC voltage transformer 143 is adjusted to a desired frequency instructed through the AC_CLK signal.

The AC voltage transformer 143 driven by the AC driver 142 generates an AC voltage. The AC voltage transformer 143 then superimposes the AC voltage on the high DC voltage, which is output from the DC voltage transformer 113 and input into the AC voltage transformer 143 via a harness 302, to generate a superimposed voltage. The AC voltage transformer 143 applies the superimposed voltage thus generated to the secondary transfer opposed roller 33 via a harness 301. If the AC voltage transformer 143 does not generate the AC voltage, the AC voltage transformer 143 outputs or applies the high DC voltage, which is output from the DC voltage transformer 113 and input into the AC voltage transformer 143 via the harness 302, to the secondary transfer opposed roller 33 via the harness 301. Subsequently, the voltage, that is, the superimposed voltage or the DC voltage, applied to the secondary transfer opposed roller 33 returns to the DC power source 110 via the secondary transfer roller 400.

The AC output detector 144 detects an output value of the AC voltage from the AC voltage transformer 143 and outputs the output value of the AC voltage to the AC output controller 141. On the other hand, the AC output detector 144 outputs the output value of the AC voltage thus detected to the power source controller 200 as a feedback alternating current (FB_AC) signal so that the power source controller 200 controls the duty of the AC_PWM signal to prevent decrease in transferability due to the environment and load.

In the present embodiment, the AC power source 140 is under constant-voltage control. Alternatively, the AC power source 140 may be under constant-current control. The waveform of the AC voltage generated by the AC voltage transformer 143 of the AC power source 140 is either a sine wave or a square wave. In the present embodiment the AC voltage transformer 143 of the AC power source 140 generates a short-pulse square wave AC voltage to enhance image quality.

The secondary transfer bias is supplied by switching "DC voltage and AC voltage" and "DC voltage". Specifically, the secondary transfer power source 39 changes modes to output voltage. The modes includes: a first mode to output the DC voltage only (i.e., DC transfer bias); and second and third modes to output the superimposed voltage in which the AC voltage is superimposed on the DC voltage. The first mode is a DC transfer mode. The second mode is a low duty AC transfer mode. The third mode is a high duty AC transfer mode. The "AC transfer" herein refers to a transfer with the superimposed voltage.

For example, upon use of a recording medium P having a relatively small surface roughness, such as plain paper, which has a surface roughness smaller than a predetermined value, a shading pattern conforming to the surface roughness pattern of the recording medium P is less likely to appear on the recording medium P. In this case, the secondary transfer power source 39 applies only the DC voltage as the secondary transfer bias to the secondary transfer opposed roller 33 in the first mode. By contrast, upon use of a recording medium P having a relatively large surface roughness, such as pulp paper and embossed paper, which has a surface roughness equal to or greater than the predetermined value, the secondary transfer power source 39 applies the superimposed voltage, in which the AC voltage is superimposed on the DC voltage, as the secondary transfer bias to the secondary transfer opposed roller 33 in the second mode. That is, the secondary transfer power source 39 switches between the first mode and the second mode to output the secondary transfer bias depending on the type (i.e., surface roughness) of the recording medium P to be used.

Figure 6:
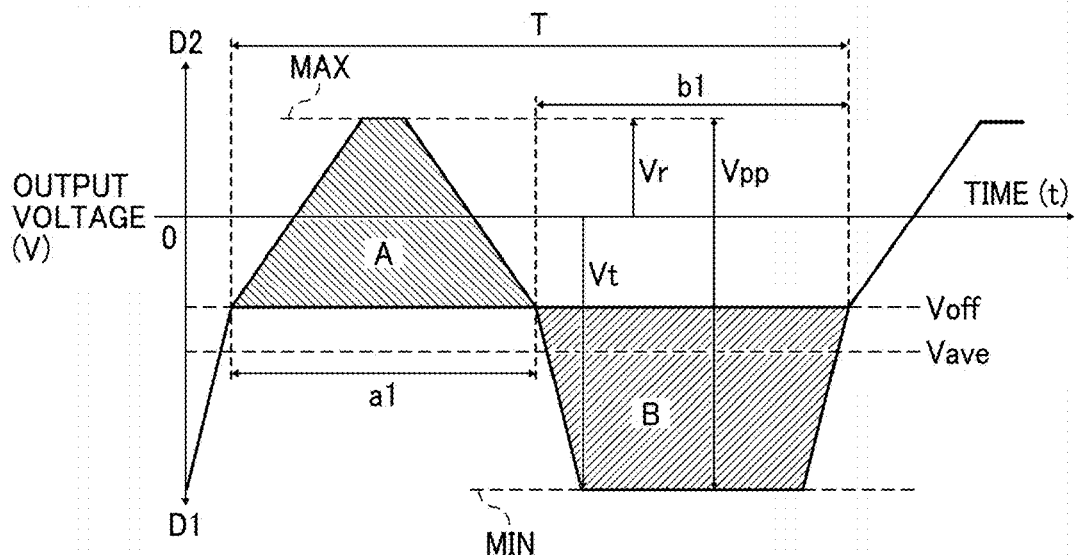
FIG. 6 is a waveform chart illustrating an example of a waveform of an alternating current component of a secondary transfer bias.

In the low duty AC transfer mode as illustrated in FIG. 6, for example, a time-averaged value (Vave) of voltage as an AC component of the secondary transfer bias is on a transfer-direction side D1 from a center value (Voff) of a maximum value and a minimum value of the AC component. In other words, a time-averaged voltage (Vave) of the AC component of the secondary transfer bias is on a transfer side from a median value (Voff) of a maximum voltage and a minimum voltage of the AC component. That is, an area defined by a median value (Voff) line and a waveform of the AC component on a ret urn-direction side D2 or return side from the median value (Voff) line is smaller than an area defined by the median value (Voff) line and the waveform of the AC component on the transfer-direction side D1 from the median value (Voff) line. It is to be noted that the time-averaged value (Vave) is a time-averaged value of the voltage obtained by dividing an integrated value of the voltage waveform over one cycle or period of time (T) by a length of the cycle or period of time (T). In FIG. 6, "MAX" represents the maximum voltage, that is, a peak voltage in a return direction. "MIN" represents the minimum voltage, that is, a peak voltage in a transfer direction, "a1" represents a time in the return direction while "b1" represents a time in the transfer direction.

FIG. 6 illustrates a trapezoid waveform with upward and downward gradients of the voltage on the return-direction side D2 smaller than upward and downward gradients of the voltage on the transfer-direction side D1.

The voltage waveform is not limited to the trapezoid waveform. Alternatively, the voltage waveform may be a triangular waveform, a rectangular waveform, or a combination of these waveforms. That is, the voltage waveform is not limited to a particular waveform. As a value indicating a relation of the median value (Voff) and the time-averaged value (Vave), a return time (%) refers to a rate of the area defined by the median value (Voff) line and the waveform on the return-direction side D2 from the median value (Voff) line with respect to the entire AC waveform. That is, a relation of duty=A/(A+B)×100% is satisfied. "A" represents the area defined by the median value (Voff) line and the waveform on the return-direction side D2 from the median value (Voff) line in the period of time (T) of the alternating voltage waveform. By contrast, "B" represents the area defined by the median value (Voff) line and the waveform on the transfer-direction side D1 from the median value (Voff) line in the period of time (T) of the alternating voltage waveform.

In other words, the duty refers to a rate of time for outputting a voltage on the return side from the median value (Voff) to return the toner, with respect to the period of time (T) of the alternating voltage waveform. The voltage on the return side from the median value (Voff) has a polarity opposite a polarity of a voltage on the transfer side from the median value (Voff).

The low duty AC transfer bias is an AC component having a decreased duty that causes the toner to reciprocate and relatively move from the intermediate transfer belt 31 to the recording medium P. Accordingly, upon use of the recording medium P having a relatively large surface roughness, the low duty AC transfer mode enhances transferability of toner to recesses on the rough surface of the recording medium P. That is, sufficient image density is obtained in all the asperities on the surface of the recording medium P, preventing appearance of voids. Thus, a reliable image can be obtained.

FIG. 7 is a block diagram of a control system of the image forming apparatus 500.

The controller 60 is, e.g., a processor or control circuitry that includes a central processing unit (CPU) 60a as a computing device provided with, e.g., the random access memory (RAM) 60c as a nonvolatile memory, a read only memory (ROM) 60b as a temporary storage device, and a flash memory (FM) 60d. The controller 60 is operatively connected to various components and sensors to control the entire image forming apparatus 500.

FIG. 7 illustrates representative components and sensors of the image forming apparatus 500. The image forming apparatus 500 of the present embodiment corrects the secondary transfer bias depending on various conditions as described below. The controller 60 executes such bias correction.

As described above, the primary transfer power source 81 applies the primary transfer bias to the primary transfer roller 35. The secondary transfer power source 39 outputs the secondary transfer bias that is supplied to the secondary transfer nip N. The secondary transfer power source 39 and the controller 60 construct a transfer bias output device. An operation panel 50 includes, e.g., a touch panel and a plurality of keys. For example, the operation panel 50 displays an image on a screen thereof. The operation panel 50 receives manual instructions through the touch panel and/or the plurality of keys.

In addition, the operation panel 50 displays information on the screen thereof for selection of a type of the recording medium P. An operator, for example, operates the operation panel 50 to select the type of the recording medium P for use in the image forming apparatus 500. The controller 60 includes a storage device (i.e., memory) to store information on the type of the recording medium P selected through the operation panel 50. The controller 60 controls the secondary transfer bias output from the secondary transfer power source 39 depending on the type of the recording medium P selected through the operation panel 50. The controller 60 controls the secondary transfer bias via the power source controller 200 of the secondary transfer power source 39 illustrated in FIG. 5. The controller 60 switches between the first mode, the second mode, and the third mode described above depending on the type of the recording medium P selected through the operation panel 50. A detailed description of the first through third modes is deferred. As described above, in the present embodiment, the type of the recording medium P is selected through the operation panel 50. Alternatively, a sensor may be disposed near the recording medium conveyance passage near the sheet tray 100 to detect the type of the recording medium P.

Now, a description is given of a secondary transfer control executed by the controller 60.

In the secondary transfer control, the controller 60 controls the secondary transfer power source 39 to control voltage output from the power source. It is to be noted that control examples described below have identical structure, differing only in the parameter used as a control reference. Table 1 below illustrates recording media P used in the control examples.

TABLE 1

| TYPE OF RECORDING MEDIUM | RECESS DEPTH (μm) |
|---|---|
| ZetaHammer 100 g | 48 |
| Leathac 100 kg | 85 |
| Leathac 130 kg | 101 |
| Leathac 175 kg | 112 |

Table 1 illustrates the type of the recording media P by name (i.e., brand name) and grammage. The surface roughness of the recording media P indicates the depth of recesses on the surface of the recording media P. Deeper recesses form greater surface roughness of the recording media P.

In the control examples described below, the transferability of toner to the recesses and discharge characteristics at the recesses are ranked by Grades 1 through 5, thus being evaluated.

Initially, a description is given of evaluation of the transferability of toner to the recesses on the surface of the recording media P.

Specifically, Grade 5 indicates that sufficient image density is obtained at the recesses as a sufficient amount of toner enters the recesses on the surface of the recording media P. Grade 4 indicates that the recesses have a slight void (i.e., white void where toner is unfilled) or that the image density at the recesses is slightly lower than the image density at a smooth portion on the surface of the recording media P. Grade 3 indicates that the void is greater than that of Grade 4 or that reduction in image density is prominent as compared to that of Grade 4. Grade 2 indicates that the void is greater than that of Grade 3 or that reduction in image density is prominent as compared to that of Grade 3. Grade 1 indicates that the recesses are substantially white and an entire shape of the recesses can be clearly acknowledged or that the condition is worse than that of Grade 2, that is, the recesses have an image density lower than the image density of Grade 2.

Now, a description is given of evaluation of the discharge characteristics at the recesses.

The secondary transfer bias may cause discharge in the secondary transfer nip N, specifically, in slight gaps between the recesses on the surface of the recording medium P and the intermediate transfer belt 31. As a consequence, a void may appear on an image. Such appearance of void is evaluated as discharge characteristics by Grades 1 through 5. Specifically, Grade 5 indicates that no void appears due to discharge. Grade 4 indicates that one or a few small voids appear. Grade 3 indicates that more voids appear than that of Grade 4. Grade 2 indicates that more voids appear than that of Grade 3. Grade 1 indicates that voids appear on an entire image and the image looks worse than Unit of Grade 2.

A secondary transfer control according to a first embodiment includes correction of the secondary transfer bias depending on the environmental conditions.

Use of the recording medium P having good surface smoothness such as plain paper and coated paper in the image forming apparatus (e.g., image forming apparatus 500) may trigger a secondary transfer error, producing an image with insufficient image density. With respect to such a transfer error, the present inventors have recognized the following. In a secondary transfer nip, a secondary transfer current flows between a contact roller and an opposed roller that sandwich an intermediate transfer belt. If the intermediate transfer belt is a multilayer belt, the secondary transfer current flows in a thickness direction of the intermediate transfer belt while flowing in a circumferential direction of the intermediate transfer belt along a boundary between layers. That is, the secondary transfer current flows not only at a central portion of the secondary transfer nip, at which a highest pressure is exerted than the pressure exerted at other portions, but also near an entrance and an exit of the secondary transfer nip. As a consequence, the secondary transfer current flows in a toner image on the intermediate transfer belt for an extended period of time in the secondary transfer nip. That is, the toner image is supplied with a large amount of electrical charge having a polarity opposite a polarity of charged toner of the toner image, decreasing a charged amount of toner (i.e., charge-to-mass ratio Q/M) when the toner has a normal polarity. Accordingly, transferability of toner onto the recording medium P is degraded, producing an image with insufficient imago density.

Hence, according to the embodiments of the present disclosure, the secondary transfer power source 39 outputs a secondary transfer bias with a duty greater than 50% to suppress decrease in the charged amount of toner Q/M when the toner image is supplied with the electrical charge having a polarity opposite the polarity of charged toner of the toner image at the secondary transfer nip. Accordingly, the toner image is reliably transferred onto the recording medium P with sufficient image density.

However, if such a high duty transfer bias is applied, the AC voltage having a greater peak-to-peak value is efficacious in higher temperature/humidity environment. On the other hand, if a low duty transfer bias is applied to enhance transferability of toner onto a rough surface of a recording medium, the AC voltage having a smaller peak-to-peak value is efficacious in the higher temperature/humidity environment to prevent discharge that may cause appearance of voids. According to the embodiments of the present disclosure, the transfer bias having a relatively high duty is corrected in a different way from a way of correction of the transfer bias having a relatively low duty. That is, the transfer biases with different duties are corrected in different ways.

The above description is an example of charging toner of the toner image formed on the multilayer intermediate transfer belt. If the intermediate transfer belt is not a multilayer belt, an insufficiency of image density may occur similarly, for example, when the secondary transfer nip is relatively wide in a recording medium conveyance direction, when a relatively large pressure is exerted at the secondary transfer nip, when a given amount of the intermediate transfer belt is wrapped around a secondary transfer device such as a belt and a roller at the secondary transfer nip, and when the linear velocity is relatively low. Similarly, such an insufficiency of image density may occur depending on the type of toner and a material of an image bearer such as a belt used in the image forming apparatus.

In the present embodiment, when a low duty transfer bias is applied, the controller 60 controls the secondary transfer power source 39 to decrease a difference (Vpp) between a maximum value and a minimum value of voltage applied for the secondary transfer of the toner image in response to detection of increase in temperature/humidity (i.e., absolute humidity) by the environmental detector. Table 2 illustrates evaluation results of the transferability of toner to the recess and the discharge characteristics at the recesses according to the present embodiment and a comparative example 1. The present embodiment is described as a control example 1 in Table 2.

TABLE 2

|  | TEMPER-ATURE/HUMID-ITY | Vpp (kV) | DUTY (%) | TRANS-FER-ABILITY AT RECESSES | DIS-CHARGE CHAR-ACTER-ISTICS |
| --- | --- | --- | --- | --- | --- |
| COM-PARATIVE EXAMPLE 1 | 10° C./15% | 8 | 20 | 4 | 5 |
|  | 23° C./50% | 8 | 20 | 5 | 5 |
|  | 27° C./80% | 8 | 20 | 4 | 2 |
| CONTROL EXAMPLE 1 | 10° C./15% | 10 | 20 | 5 | 4 |
|  | 23° C./50% | 8 | 20 | 5 | 5 |
|  | 27° C./80% | 6 | 20 | 5 | 5 |

In the comparative example 1 of Table 2, the duty and peak-to-peak voltage (Vpp) are unchanged regardless of changes in temperature and humidity. By contrast, in the control example 1, the peak-to-peak voltage (Vpp) is changed along changes in temperature and humidity.

The higher temperature and humidity are, the lower the electrical resistance of the recording medium P is. Therefore, the peak-to-peak voltage (Vpp) and the time-averaged value (Vave) of the voltage for transfer of the toner image decrease.

Table 2 illustrates the discharge characteristics ranked low in the high temperature/humidity environment in the comparative example 1, in which the peak-to-peak voltage (Vpp) is unchanged.

By contrast, in the control example 1, the secondary transfer bias is corrected to decrease the peak-to-peak voltage (Vpp) at higher temperature/humidity to prevent discharge. That is, the peak-to-peak voltage (Vpp) is decreased at higher temperature/humidity. Such control results in higher evaluation of the transferability of toner to the recesses and the discharge characteristics at the recesses compared to the comparative example 1. With an increased transfer rate, sufficient image density is obtained at both the bulges and the recesses on the surface of the recording medium P without voids. That is, a reliable image is obtained.

In the present embodiment, the peak-to-peak value (Vpp) of the secondary transfer bias is changed among three levels: 10 kV; 8 kV; and 6 kV, depending on the temperature and humidity. The levels of the peak-to-peak voltage (Vpp) are not limited to those three levels. For example, the peak-to-peak voltage (Vpp) of the secondary transfer bias may be changed between two levels, or among four or more levels.

Thus, the secondary transfer bias is corrected depending on the environmental conditions. Specifically, the peak-to-peak voltage (Vpp) is corrected depending on the temperature and humidity detected by the temperature/humidity sensor 106 as an environment detector incorporated in the image forming apparatus 500 illustrated in FIG. 1. The peak-to-peak voltage (Vpp) is obtained by the following equation:

Vpp=reference Vpp×environmental correction, where the "reference Vpp" is a reference peak-to-peak value (Vpp) predetermined according to, e.g., a linear velocity (i.e., printing speed) of the image forming apparatus, and the "environmental correction" is an environmental correction coefficient in response to changes in the environment such as temperature and humidity. The temperature/humidity sensor 106 incorporated in the image forming apparatus 500 detects temperature based on an output of a thermistor incorporated therein, and detects humidity based on an output of a humidity sensor incorporated therein.

Detection of temperature and humidity is sampled per minute after the power source of the image forming apparatus 500 is activated. The environmental correction is performed in synchronization with the detection of temperature and humidity. The location of the temperature/humidity sensor 106 is not limited to a particular location. Preferably, the temperature/humidity sensor 106 is disposed away from a heater of the fixing device 90. In the present embodiment, the temperature/humidity sensor 106 is disposed below the transfer device 30 as illustrated in FIG. 1. Alternatively, the temperature/humidity sensor 106 may be disposed beside or below a sheer feeding device (e.g., the sheet tray 100 and the sheet feeding roller 100a).

Figure 8:
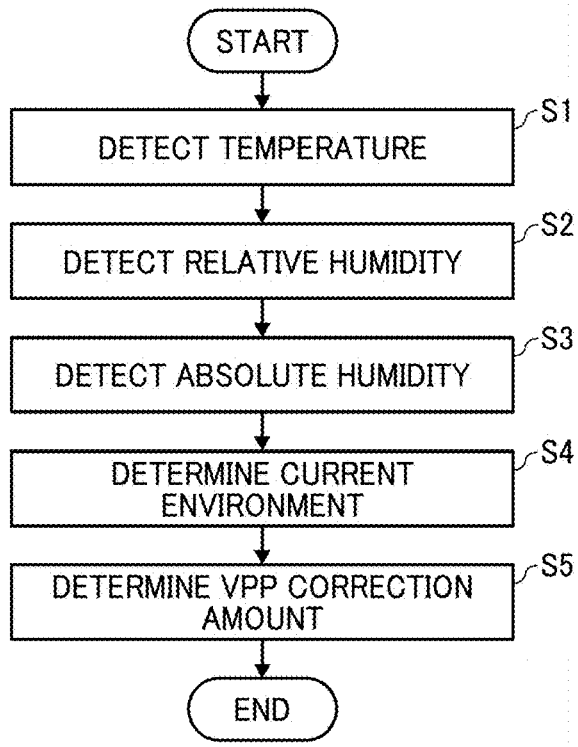
FIG. 8 is a flowchart of a bias control executed by a controller incorporated in the image forming apparatus of FIG. 1.

Referring now to FIG. 8. a description is given of a flow of an example of a bias control executed by the controller 60.

FIG. 8 is a flowchart of the example of the bias control.

In step S1, an output of the thermistor incorporated in the temperature/humidity sensor 106 is detected as a thermistor output. A temperature is determined from a conversion table of thermistor output and temperature based on a correlation of the temperature and the output of the thermistor.

In step S2, an output of the humidity sensor incorporated in the temperature/humidity sensor 106 is detected as a humidity sensor output. A relative humidity is determined from the temperature determined in step S1 and from a conversion table of humidity sensor output and relative humidity. The conversion table of humidity sensor output and relative humidity includes temperature data on the horizontal axis and humidity data on the vertical axis to obtain the relative humidity.

In step S3, an absolute humidity is obtained from the relative humidity determined in step S2 and from a conversion table of relative humidity and absolute humidity. The conversion table of relative humidity and absolute humidity includes relative humidity data on the horizontal axis and temperature data on the vertical axis to obtain the absolute humidity. Alternatively, the absolute humidity may be obtained by an equation based on the temperature and the relative humidity.

In step S4, a current environment is determined from the absolute humidity obtained in step S3 and a conversion table of absolute humidity and current environment. The current environment is herein classified into, e.g., L/L (19° C./30%), M/L (23° C./30%), M/M (23° C./50%), M/H (23° C./80%), and H/H (27° C./80%). Values and combinations of temperature and humidity are not limited thereto. In the "current environment" column of Table 3, "LL" represents an environment at a minimum absolute humidity. "HH" represents an environment at a maximum absolute humidity.

In step S5, the peak-to-peak voltage (Vpp) is corrected based on an amount of correction according to the current environment obtained in step S4.

The correction value (%) is determined by, e.g., a relation illustrated in Table 3 below. In the present embodiment, α is 25% and β is 13%. The relation of the current environment and the correction value (%) is not limited thereto.

TABLE 3

| CURRENT ENVIRONMENT | LL | ML | MM | NM | NH |
| --- | --- | --- | --- | --- | --- |
| VPP CORRECTION VALUE (%) | +α | +β | ±0 | −β | −α |

Since detection by the temperature/humidity sensor (e.g., temperature/humidity sensor 106) obviates mechanical operation, constant monitoring is feasible, allowing consecutive control in response to environmental changes.

As described above, the controller 60 illustrated in FIG. 7 executes control for correcting the transfer bias based on the readings of the temperature/humidity sensor 106. In addition, the controller 60 executes control for correcting a threshold voltage described above.

In the present embodiment, the temperature/humidity sensor 106 functions as an environmental detector that detects temperature and relative humidity. Alternatively, the environmental detector may be a temperature sensor that detects temperature only. Alternatively, the environmental detector may be a humidity sensor that detects relative humidity only.

The control example 1 described above and a control example according to a second embodiment described below are examples of the low duty AC transfer mode (i.e., second mode).

Now, a description is given of the high duty AC transfer mode (i.e., third mode).

Figure 9:
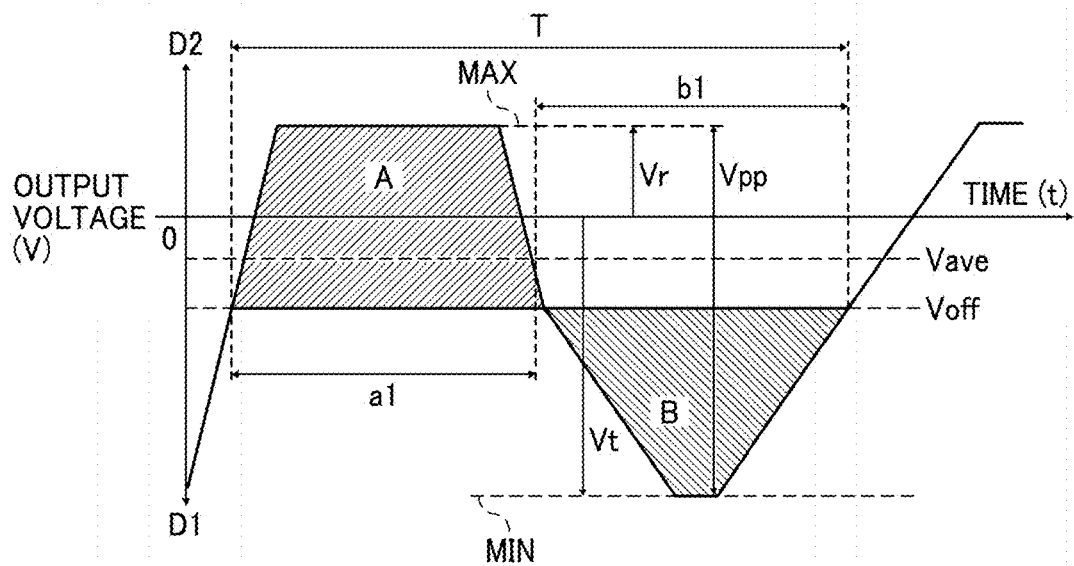
FIG. 9 is a waveform chart illustrating another example of the waveform of the alternating current component of the secondary transfer bias.

In the high duty AC transfer mode as illustrated in FIG. 9, for example, the time-averaged value (Vave) of voltage as an AC component of the secondary transfer bias is on the return-direction side D2 from the median value (Voff) of the maximum value and the minimum value of the AC component. In other words, the time-averaged voltage (Vave) of the AC component of the secondary transfer bias is on the return side from the median value (Voff) of the maximum voltage and the minimum voltage of the AC component. That is, the area defined by the median value (Voff) line and the waveform of the AC component on the return-direction side D2 from the median value (Voff) line is greater than the area defined by the median value (Voff) line and the waveform of the AC component on the transfer-direction side D1 from the median value (Voff) line. It is to be noted that the time-averaged value (Vave) is a time-averaged value of the voltage obtained by dividing an integrated value of the voltage waveform over the cycle or period of time (T) by a length of the cycle or period of time (T). in FIG. 9, "MAX" represents the maximum voltage, that is, a peak voltage in the return direction. "MIN" represents the minimum voltage, that is, a peak voltage in the transfer direction, "a1" represents a time in the return direction while "b1" represents a time in the transfer direction.

FIG. 9 illustrates a trapezoid waveform with upward and downward gradients of the voltage on the return-direction side D2 greater than upward and downward gradients of the voltage on the transfer-direction side D1.

The voltage waveform is not limited to the trapezoid waveform. Alternatively, the voltage waveform may be a triangular waveform, a rectangular waveform, or a combination of these waveforms. That is, the voltage waveform is not limited to a particular waveform.

The duty herein defined is identical to the duly defined above in the description of the low duty AC transfer mode. That is, as a value indicating the relation of the median value (Voff) and the time-averaged value (Vave), the return time (%) refers to a rate of the area defined by the median value (Voff) line and the waveform on the return-direction side D2 from the median value (Voff) line with respect to an entire AC waveform. That is, the relation of duty=A/(A+B)×100% is satisfied. "A" represents the area defined by the median value (Voff) line and the waveform on the return-direction side D2 from the median value (Voff) line in the period of time (T) of the alternating voltage waveform. By contrast, "B" represents the area defined by the median value (Voff) line and the waveform on the transfer-direction side D1 from the median value (Voff) line in the period of time (T) of the alternating voltage waveform.

In other words, the duty refers to a rate of time for outputting the voltage on the return side from the median value (Voff) to return the toner, with respect to the period of time (T) of the alternating voltage waveform. The voltage on the return side from the median value (Voff) has a polarity opposite the polarity of the voltage on the transfer side from the median value (Voff).

Use of the recording medium P having good surface smoothness such as coated paper in the image forming apparatus (e.g., image forming apparatus 500) may trigger a secondary transfer error, producing an image with insufficient image density. To address this circumstance, in the present embodiment, the image forming apparatus 500 performs a prim job in the third mode (i.e., high duty AC transfer mode) when forming an image on the recording medium P having a surface smoothness equal to or greater than a predetermined value, such as coated paper.

In the high duty AC transfer mode, the secondary transfer bias has a positive polarity to return the toner for a period of time longer than half the period of time (T). That is, the duty exceeds 50%. Applying such a secondary transfer bias shortens a period of time to possibly supply toner with electrical charge having a positive polarity opposite the polarity of the charged toner within the period of time (T). Such charging in the secondary transfer nip suppresses decrease in the charged amount of toner Q/M. As a consequence, the toner image is reliably transferred onto the recording medium P with sufficient image density. If the duty exceeds 50%, the toner image can be reliably transferred onto the recording medium P with an average potential having a negative polarity as in the graph of which an area on the positive side from an origin 0 V is smaller than an area on the negative side. Such an average potential having negative polarity electrostatically moves the toner from the intermediate transfer belt 31 to the recording medium P relatively.

Figure 10:
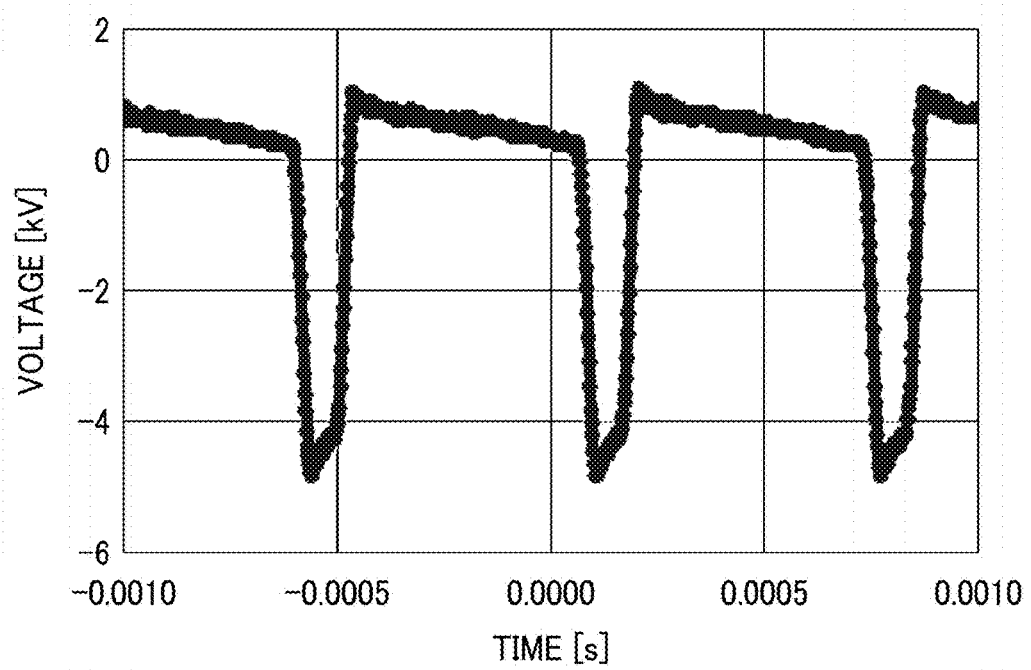
FIG. 10 is a waveform chart illustrating a waveform of the secondary transfer bias output from a prototype image forming apparatus in an experiment.

FIG. 10 is a waveform chart illustrating a waveform of a secondary transfer bias output from a secondary transfer power source of a prototype image forming apparatus having a configuration identical to the configuration of the image forming apparatus 500 illustrated in FIG. 1. FIG. 10 illustrates a peak value (Vt) of −4.8 kV of the voltage on the transfer side, that is, the voltage having a polarity identical to the polarity of the toner. By contrast, FIG. 10 illustrates a peak value (Vr) of 1.2 kV of the voltage on the return side, that is, the voltage having a polarity opposite the polarity of the toner. The offset voltage (Voff) is −1.8 kV. The average potential (Vave) is 0.08 kV. The peak-to-peak voltage (Vpp) is 6.0 kV. The time in the transfer direction (b1) is 0.10 ms. The period of time (T) is 0.66 ms. The duty is 85%.

As an experiment, the inventors of the present application printed test images with various rates of duty of the secondary transfer bias, under the following conditions:
  Environment conditions: 27° C./80%;
  Type of recording medium P: coated paper "mohawk color copy gloss 270 gsm" (457 mm×305 mm):
  Process linear velocity; 630 mm/s;
  Test image: black halftone image;
  Width of secondary transfer nip (i.e., length of secondary transfer nip in direction of rotation of belt): 4 mm;
  Same-polarity peak value (Vt): −4.8 kV;
  Reverse-polarity peak value (Vr): 1.2 kV;
  Offset voltage (Voff): −1.8 kV;
  Average potential (Vave): 0.08 kV;
  Peak-to-peak value (Vpp): 6.0 kV;
  Time in transfer direction (b1): 0.10 ms;
  Period of time (T); 0.66 ms; and
  Duty: 90%; 70%: 50%: 30%; and 10%.

Figure 11A:
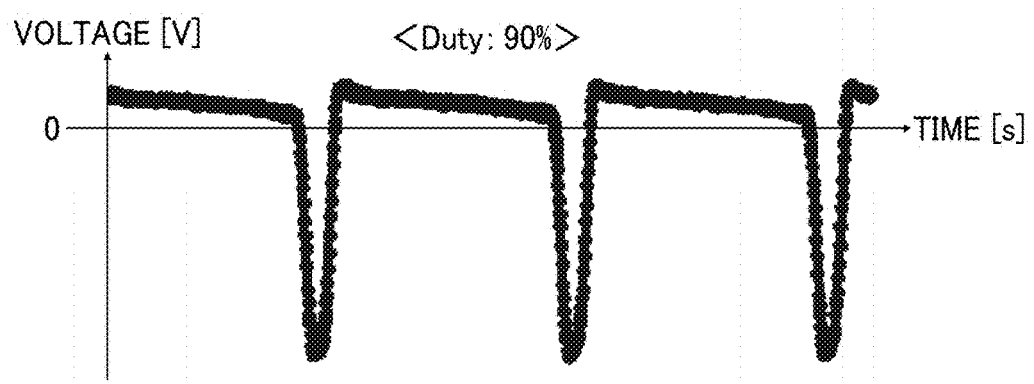
FIG. 11A is a waveform chart of an actual output waveform of the secondary transfer bias with a duty of 90%.
Figure 11B:
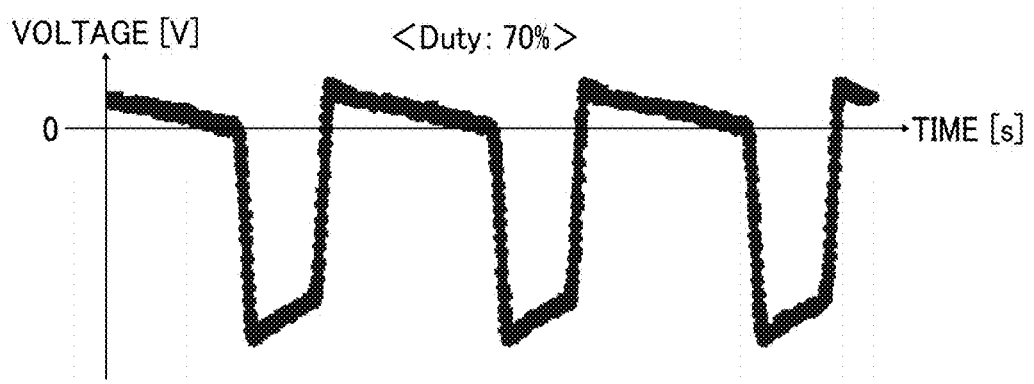
FIG. 11B is a waveform chart of an actual output waveform of the secondary transfer bias with a duty of 70%.
Figure 11C:
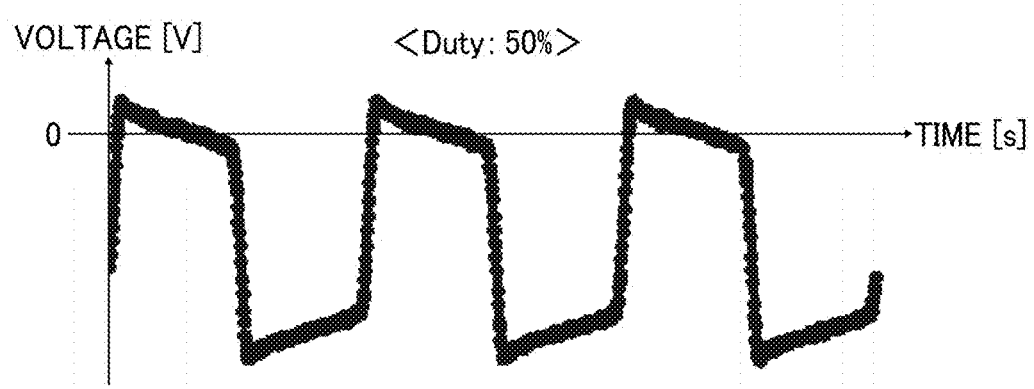
FIG. 11C is a waveform chart of an actual output waveform of the secondary transfer bias with a duty of 50%.

Each of FIGS. 11A through 11E is a waveform chart of an actual output waveform of the secondary transfer bias with a rate of duty described above. Specifically, FIG. 11A is a waveform chart of an actual output waveform of the secondary transfer bias with a duty of 90%. FIG. 11B is a waveform chart of an actual output waveform of the secondary transfer bias with a duty of 70%. FIG. 11C is a waveform chart of an actual output waveform of the secondary transfer bias with a duty of 50%. FIG. 11D is a waveform chart, of an actual output waveform of the secondary transfer bias with a duty of 30%. FIG. 11E is a waveform chart of an actual output waveform of the secondary transfer bias with a duty of 10%.

FIG. 11F is a table illustrating evaluation results of reproducibility of image density of the test images printed with various rates of duty described above.

The reproducibility of image density of the test images are ranked by Grades 1 through 5. Specifically, Grade 5 indicates that sufficient halftone density is obtained. Grade 4 indicates that the image density is slightly lower than the image density of Grade 5, but is substantially sufficient. Grade 3 indicates that the image density is lower than the image density of Grade 4 and the image quality is insufficient to be provided. Grade 2 indicates that the image density is lower than the image density of Grade 3. Grade 1 indicates that the test image is white overall or even whiter. An image of Grade 4 or higher is an image that has an acceptable quality to be provided.

The secondary transfer bias with a duty of 10% or 30% relatively lengthened the period of time to possibly supply toner with electrical charge having a polarity opposite the polarity of the toner within the period of lime (T). Such charging for a lengthened period of time significantly decreased the charged amount of toner Q/M, producing a toner image with significantly insufficient image density ranked as Grade 1 in FIG. 11F.

By contrast, the secondary transfer bias with a duty of 70% or 90% relatively shortened tire period of time to possibly supply toner with electrical charge having a polarity opposite the polarity of the toner within the period of time (T). Such charging for a shortened period of time effectively suppressed decrease in the charged amount of toner Q/M, producing a toner image with appropriate image density ranked as Grade 4 in FIG. 11F.

As illustrated in the drawings, applying the secondary transfer bias that alternates polarities within the period of time (T) reliably suppresses an opposite charging of the toner. Even if the recording medium P is charged, the electric field having a polarity that suppresses an opposite charging of the toner acts relatively in the secondary transfer nip.

The output waveform of the high duty AC transfer mode illustrates the time for returning the toner longer than the time for transferring the toner. That is, the high duty AC transfer mode prevents excessive transfer of toner.

Now, a description is given of a control example of correcting the secondary transfer bias depending on the environmental conditions in the high duty AC transfer mode according the first embodiment.

In the present embodiment, the secondary transfer bias is corrected depending on the environmental conditions. Specifically, when a high duty transfer bias is applied, the controller 60 controls the secondary transfer power source 39 to increase the difference (Vpp) between the maximum value and the minimum value of voltage applied for the secondary transfer of the toner image in response to detection of increase in temperature/humidity (i.e., absolute humidity) by the environmental detector (i.e. temperature/humidity sensor 106).

Table 4 illustrates evaluation results of image density, that is, density of a halftone image) obtained according to the present embodiment and a comparative example 2. The present embodiment is described as a control example 2 in Table 4.

TABLE 4

| | TEMPERATURE/ HUMIDITY | Vpp (kV) | DUTY (%) | HT DENSITY |
|---|---|---|---|---|
| COMPARATIVE EXAMPLE 2 | 10° C./15% | 6 | 80 | 4 |
| | 23° C./50% | 6 | 80 | 5 |
| | 27° C./80% | 6 | 80 | 4 |
| CONTROL EXAMPLE 2 | 10° C./15% | 4 | 80 | 5 |
| | 23° C./50% | 6 | 80 | 5 |
| | 27° C./80% | 8 | 80 | 5 |

In the comparative example 2 of Table 4, the duty and peak-to-peak voltage (Vpp) are unchanged regardless of changes in temperature and humidity. By contrast, in the control example 2, the peak-to-peak voltage (Vpp) is changed along the changes in temperature and humidity.

Experimental conditions were as follows:
Environment conditions: 15° C./10%; 23° C./50%; and 27° C./80%;
Type of recording medium P; coated paper "mohawk color copy gloss 270 gsm" (457 mm×305 mm);
Process linear velocity: 630 mm/s:
Test image: black halftone image;
Width of secondary transfer nip (i.e., length of secondary transfer nip in direction of rotation of belt); 4 mm;
Peak-to-peak value (Vpp): 6.0 kV;
Time in transfer direction (b1): 0.10 ms;
Period of time (T): 0.66 ms; and
Duty: 85%.

The higher the temperature and humidity are, the more the charged amount of toner Q/M decreases. Therefore, when the toner image is transferred, oppositely charging toner contained in the toner image a fleets and decreases image density of the toner image. Table 4 illustrates a decreased density of the halftone image in the high temperature/humidity environment in the comparative example 2 in which the peak-to-peak voltage (Vpp) is unchanged.

By contrast, in the control example 2, the secondary transfer bias is corrected to increase the peak-to-peak voltage (Vpp) at higher temperature/humidity to prevent decrease in image density. That is, the peak-to-peak voltage (Vpp) is increased at higher temperature/humidity. With such control, the halftone image obtained in the control example 2 has a density higher than a density of the halftone image obtained in the comparative example 2. With an increased transfer rate, sufficient image density is obtained.

In the present embodiment, the peak-to-peak value (Vpp) of the secondary transfer bias is changed among three levels: 4 kV; 6 kV; and 8 kV, depending on the temperature and humidity. The levels of the peak-to-peak voltage (Vpp) are not limited to those three levels. For example, the peak-to-peak voltage (Vpp) of the secondary transfer bias may be changed between two levels, or among four or more levels.

In the low temperature/humidity environment, a DC bias may be applied instead of the superimposed bias. The DC bias includes a DC component only. That is, different from the superimposed bias, the DC bias does not include the AC component.

Table 5 illustrates a control example in the low temperature/humidity environment as a variation. In the low temperature/humidity environment, sufficient halftone density is obtained by the DC bias applied.

In the variation, the peak-to-peak value (Vpp) of the secondary transfer bias is changed among three levels: 0 kV; 6 kV; and 8 kV, depending on the temperature and humidity. The levels of the peak-to-peak voltage (Vpp) are not limited to those three levels. For example, the peak-to-peak voltage (Vpp) of the secondary transfer bias may be changed between two levels: 0 kV and 6 kV. Alternatively, the peak-to-peak voltage (Vpp) of the secondary transfer bias may be changed among four or more levels.

TABLE 5

| | TEMPERATURE/ HUMIDITY | Vpp (kV) | DUTY (%) | HT DENSITY |
|---|---|---|---|---|
| COMPARATIVE EXAMPLE 2 | 10° C./15% | 6 | 80 | 4 |
| | 23° C./50% | 6 | 80 | 5 |
| | 27° C./80% | 6 | 80 | 4 |
| VARIATION | 10° C./15% | 0 | — | 5 |
| | 23° C./50% | 6 | 80 | 5 |
| | 27° C./80% | 8 | 80 | 5 |

In the high duty AC transfer mode, the secondary transfer bias is corrected depending on the environmental conditions. Specifically, the peak-to-peak voltage (Vpp) is corrected depending on the temperature and humidity detected by the temperature/humidity sensor 106 as an environment detector incorporated in the image forming apparatus 500 illustrated in FIG. 1.

As in the low duty AC transfer mode described above, the correction value (%) is determined by, e.g., a relation illustrated in Table 6 below. In the present embodiment, α is 33% and β is 17%. The relation of the current environment and the correction value (%) is not limited thereto.

TABLE 6

| CURRENT ENVIRONMENT | LL | ML | MM | NM | NH |
|---|---|---|---|---|---|
| Vpp CORRECTION VALUE (%) | −α | −β | ±0 | +β | +α |

Now, a description is given of the secondary transfer control executed by the controller 60 according to the second embodiment of the present disclosure.

The present embodiment includes correction of the secondary transfer bias depending on the surface roughness of the recording medium P, in addition to correction of the secondary transfer bias as described above in the first embodiment.

As illustrated in FIG. 6, the relation of duty=A/(A+B)*100% is satisfied. "A" represents the area defined by the median value (Voff) line and the waveform on the return-direction side D2 from the median value (Voff) line in the period of time (T) of the alternating voltage waveform. By contrast, represents the area defined by the median value (Voff) line and the waveform on the transfer-direct ion side D1 from the median value (Voff) line in the period of time (T) of the alternating voltage waveform. In the present embodiment, the controller 60 controls the secondary transfer power source 39 to decrease the duty as the surface roughness of the recording medium P in use increases. Table 7 illustrates evaluation results of the transferability of toner to the recesses on the surface of the recording media P and the discharge characteristics at the recesses according to the present embodiment and a comparative example 3. The present embodiment is described as a control example 3 in Table 7.

the duty is decreased as the surface roughness of the recording medium P increases, an absolute time-averaged value (Vave) of the voltage is increased. As a consequence, the transferability of toner to the recesses is ranked higher. In short, the transfer rate increases. Accordingly, sufficient image density is obtained on both the bulges and the recesses on live surface of the recording medium P, preventing appearance of voids. Thus, a reliable image can be obtained in the low duty AC transfer mode. As described above, the AC transfer herein refers to a transfer with the superimposed voltage.

An intermediate transfer belt (e.g., intermediate transfer belt 31) having particles (e.g., particles 103) dispersed in a top layer (e.g., elastic layer 102) has a decreased contact area with toner in the secondary transfer nip (e.g., secondary transfer nip N). Such an intermediate transfer belt facilitates toner separation from the surface of the intermediate transfer belt, enhancing efficiency of secondary transfer of the toner image. On the other hand, the secondary transfer current flowing concentrically between the insulative particles (e.g., particles 103) regularly arranged may facilitate the toner to be supplied with electrical charge having a polarity opposite the polarity of the toner. As a consequence, the efficiency of secondary transfer of the toner image may be decreased, although the intermediate transfer belt has the particles dispersed therein to enhance the efficiency of secondary transfer of the toner image. To address this circumstance, in some embodiments of the present disclosure, a high-duty secondary transfer bias is applied to reliably enhance the efficiency of secondary transfer of the toner image together with the particles 103 dispersed in the intermediate transfer belt 31.

As the particles 103, particles having a charging polarity opposite the normal charging polarity of the toner may be employed. For example, positively charged melamine resin particles may be employed as the particles 103 dispersed in the intermediate transfer belt 31 incorporated in the image forming apparatus 500. With this configuration, the electri-

TABLE 7

|  | TYPE OF RECORDING MEDIUM | Vpp (kV) | DUTY (%) | Vave (kV) | TRANSFER-ABILITY AT RECESSES | DISCHARGE CHARACTER-ISTICS |
|---|---|---|---|---|---|---|
| COMPAR-ATIVE EXAMPLE 3 | Leathac 100 kg | 8 | 20 | −3.4 | 3 | 1 |
| | Leathac 130 kg | 8 | 20 | −3.4 | 3 | 3 |
| | Leathac 175 kg | 8 | 20 | −3.4 | 1 | 4 |
| CONTROL EXAMPLE 3 | Leathac 100 kg | 8 | 30 | −2.6 | 3 | 3 |
| | Leathac 130 kg | 8 | 20 | −3.4 | 3 | 3 |
| | Leathac 175 kg | 8 | 12 | −4.04 | 3 | 4 |

In the comparative example 3 of Table 7, the peak-to-peak voltage (Vpp) and the duty thereof are unchanged for several types of the recording media P having different recess depths. In the comparative example 3, the recording medium P having deeper recesses is ranked lower with respect to the transferability of toner to the recesses. On the other hand, the recording medium P having shallower recesses is ranked lower with respect to the discharge characteristics.

Similar to the comparative example 3, in the control example 3, the peak-to-peak voltage (Vpp) is unchanged for the several types of the recording media P having different recess depths. Unlike the comparative example 3, the duties are changed in the control example 3, resulting in changes in time-averaged value (Vave) of the voltage. Specifically, when the duty is decreased for a deeper recess, that is, when cal charge of the particles 103 suppresses concentration of the secondary transfer current between the particles 103, further reducing an oppositely charged amount of toner.

Alternatively, in some embodiments, particles having a charging polarity identical to the normal charging polarity of the toner may be employed as the particles 103. For example, negatively charged silicone resin particles such as Tospearl (registered trademark) may be employed as the particles 103 dispersal in the intermediate transfer belt 31 incorporated in the image forming apparatus 500.

In some embodiments, the intermediate transfer belt 31 may include a surface or coating layer made of urethane or Teflon (registered trademark) as a top layer. Alternatively, a plurality of layers made of resin such as polyimide and polyamide-imide may rest one atop another. In use of any belt described above, applying the high-duty secondary transfer bias suppresses an insufficiency of image density.

In an image forming apparatus (e.g., image forming apparatus 500) according to the embodiments described above, when a duty of an AC component of a bias is 50% or less, a peak-to-peak voltage (Vpp) is corrected to decrease at higher temperature and/or humidity. By contrast, when the duty of the AC component of the bias is greater than 50%, the peak-to-peak voltage (Vpp) is corrected to increase at higher temperature and/or humidity.

Accordingly, the image forming apparatus enhances the transferability of a toner image onto a recording medium (e.g., recording medium P) having a relatively large surface roughness. On the other hand, the image forming apparatus reliably transfers the toner image onto a recording medium having a relatively small surface roughness. Accordingly, the image forming apparatus exhibits an enhanced transferability of the toner image onto the recording medium having a rough surface and an enhanced transferability of a halftone toner image in the high temperature/humidity environment.

A power source (e.g., secondary transfer power source 39) that outputs the bias includes two transformers (e.g., first transformer 143A, second transformer 143B) that output voltages with different duties. The duty of the voltage output from one of the two transformers is greater than the duty of the voltage output from the other one of the two transformers. Thus, the image forming apparatus incorporates the power source capable of outputting low-duty voltage and high-duty voltage, facilitating control of the power source.

In addition, the duty of the voltage output from the one of the two transformers is 50% or less while the duty of the voltage output from the other one of the two transformers is greater than 50%. These transformers facilitate the power source to output voltage with a duty appropriate for the characteristics of the recording medium and the environmental conditions.

The duty of the bias is controlled to decrease as a surface roughness of the recording medium increases. Accordingly, toner contained in the toner image is reliably transferred to recesses on the surface of the recording medium.

In addition, the peak-to-peak voltage (Vpp) is unchanged when the duty of the bias is controlled to decrease as the surface roughness of the recording medium increases. As a consequence, a time-averaged value (Vave) of the bias voltage changes, thereby enhancing the transferability of the toner to the recesses on the surface of the recording medium.

When the peak-to-peak voltage (Vpp) of the bias is changed, the peak-to-peak voltage (Vpp) is calculated by multiplying a predetermined reference value (i.e., reference Vpp) with a predetermined environmental correction coefficient, thereby facilitating determination of an optimum peak-to-peak voltage.

The reference value Vpp is determined according to a printing speed, thereby facilitating determination of a peak-to-peak voltage appropriate for the printing speed.

The transfer bias is output in a first mode, a second mode, or a third mode, depending on the type of the recording medium. Accordingly, a transfer bias is applied as appropriate for the type of the recording medium to reliably transfer the toner image.

Upon use of a recording medium having a surface roughness smaller than a predetermined value, the toner image is transferred onto the recording medium in the first mode (e.g., DC transfer mode). Accordingly, the toner image is reliably transferred onto the recording medium having a relatively small surface roughness such as plain paper.

By contrast, upon use of a recording medium having a surface roughness equal to or greater than the predetermined value, the toner image is transferred onto the recording medium in the second mode (e.g., low duty AC transfer mode). Accordingly, the toner image is reliably transferred onto the recording medium having a relatively large surface roughness.

Upon use of a recording medium having a surface smoothness equal to or greater than a predetermined value, the toner image is transferred onto the recording medium in the third mode (e.g., high duty AC transfer mode). Accordingly, the toner image is reliably transferred onto the recording medium having a smooth surface such as coated paper.

The image forming apparatus includes an image bearer (e.g., intermediate transfer belt 31) constructed of a plurality of layers which includes a base layer and an elastic layer resting on the base layer. The elastic layer of the image bearer flexibly deforms by its elasticity in a transfer nip (e.g., secondary transfer nip N). Accordingly, the image bearer adheres to the recording medium having a relatively large surface roughness, thereby enhancing transferability of the toner image onto the recording medium having a relatively large surface roughness.

The elastic layer has a surface with a plurality of particles (e.g., particles 103) dispersed. Existence of the plurality of particles on the surface of the elastic layer reduces a contact area between toner and the surface of the elastic layer in the transfer nip. Accordingly, the toner is facilitated to separate from the surface of the image bearer, thereby enhancing the transfer efficiency.

The plurality of particles has a charging polarity opposite a normal charging polarity of the toner. Electrical charge of the plurality of particles suppresses concentration of transfer current between the individual particles, thereby further reducing an oppositely charged amount of the toner.

A coating layer may rest on the elastic layer of the image bearer as a surface layer. The coating layer made of a material that facilitates toner separation front the coating layer further enhances the transfer efficiency.

The present disclosure is not limited to the details of the embodiments and examples described above. For example, the transfer device may have another, proper configuration. Similarly, the power source may be have another, proper configuration.

The image forming apparatus may have another structure in which, for example, the image forming devices may be aligned in an order different from the order illustrated in FIG. 1. The image forming apparatus is not limited to a machine that employs toner of four colors. The image forming apparatus may be, e.g., a full-color machine employing toner of three colors, or a multicolor machine employing toner of two colors. The image forming apparatus is not limited to a printer. Alternatively, for example, the image forming apparatus may be a copier, a facsimile machine, or an MFP having at least one of copying, printing, scanning, facsimile, plotter functions, and the like.

The secondary transfer bias may be a bias having a DC component under constant-current control or under constant-voltage control. Similarly, the secondary transfer bias may be a bias having an AC component under constant-current control or under constant-voltage control.

In the embodiments described above, the secondary transfer power source 39 applies the secondary transfer bias to the secondary transfer opposed roller 33. Alternatively, the secondary transfer power source 39 may apply the secondary transfer bias to the secondary transfer roller 400.

According to the embodiments of the present disclosure, the image forming apparatus enhances transfer of a toner image onto a recording medium having a relatively large surface roughness. On the other hand, the image forming apparatus reliably transfers the toner image onto a recording medium having a relatively small surface roughness. Accordingly, the image forming apparatus exhibits an enhanced transferability of the toner image onto the recording medium having a rough surface and an enhanced transferability of a halftone toner image in the high temperature/humidity environment.

Although the present disclosure makes reference to specific embodiments, it is to be noted that the present disclosure is not limited to the details of the embodiments described above and various modifications and enhancements are possible without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

What is claimed is:

1. An image forming apparatus comprising:
   an image bearer;
   an image forming device to form a toner image on the image bearer with toner;
   a power source to output a bias including an alternating current component to transfer the toner image onto a recording medium; and
   control circuitry to control the power source,
   the control circuitry controlling the power source to decrease a peak-to-peak voltage of the bias in response to increase in at least one of temperature and humidity, when a time-averaged voltage of the bias is on a transfer side of transferring the toner from the image bearer to the recording medium, from a median value of a maximum voltage and a minimum voltage of the bias,
   the control circuitry controlling the power source to increase the peak-to-peak voltage of the bias in response to increase in at least one of temperature and humidity, when the time-averaged voltage of the bias is on a return side of returning the toner from the recording medium to the image bearer, from the median value of the maximum voltage and the minimum voltage of the bias.

2. The image forming apparatus according to claim 1, wherein a relation of duty=A/(A+B)×100% is satisfied,
   where "A" represents an area defined by a median value line and a waveform on the return side from the median value line in a cycle of a waveform of the bias, and "B" represents an area defined by the median value line and a waveform on the transfer side from the median value line in the cycle of the waveform of the bias,
   wherein the power source includes two transformers that output voltages with different duties, and
   wherein the duty of the voltage output from one of the two transformers is greater than the duty of the voltage output from other one of the two transformers.

3. The image forming apparatus according to claim 2, wherein the duty of the voltage output from the one of the two transformers is 50% or less and the duty of the voltage output from the other one of the two transformers is greater than 50%.

4. The image forming apparatus according to claim 2, wherein the control circuitry controls the duty of the bias to decrease as a surface roughness of the recording medium increases.

5. The image forming apparatus according to claim 4, wherein the peak-to-peak voltage of the bias is unchanged regardless of the surface roughness of the recording medium.

6. The image forming apparatus according to claim 1, wherein a duty is a rate of time for outputting voltage on the return side from the median value with respect to a cycle of a waveform of the bias,
   wherein the power source includes two transformers that output voltages with different duties, and
   wherein the duty of the voltage output from one of the two transformers is greater than the duty of the voltage output from other one of the two transformers.

7. The image forming apparatus according to claim 1, wherein the control circuitry multiplies a predetermined reference value with a predetermined environmental correction coefficient to calculate and change the peak-to-peak voltage of the bias.

8. The image forming apparatus according to claim 7, wherein the reference value is determined according to a printing speed.

9. The image forming apparatus according to claim 1, further comprising a direct current power source to output a direct current transfer bias of a direct current voltage,
   wherein the control circuitry switches between modes to transfer the toner image onto the recording medium depending on a type of the recording medium, and
   wherein the modes include:
   a first mode to transfer the toner image onto the recording medium by use of the direct current transfer bias;
   a second mode to transfer the toner image onto the recording medium by use of a bias having a time-averaged voltage on the transfer side from the median value of the maximum voltage and the minimum voltage of the bias alternating polarities; and
   a third mode to transfer the toner image onto the recording medium by use of a bias having a time-averaged voltage on the return side from the median value of the maximum voltage and the minimum voltage of the bias alternating polarities.

10. The image forming apparatus according to claim 9, wherein the control circuitry selects the first mode to transfer the loner image onto the recording medium having a surface roughness smaller than a predetermined value.

11. The image forming apparatus according to claim 9, wherein the control circuitry selects the second mode to transfer the toner image onto the recording medium having a surface roughness equal to or greater than a predetermined value.

12. The image forming apparatus according to claim 9, wherein the control circuitry selects the third mode to transfer the toner image onto the recording medium having a surface smoothness equal to or greater than a predetermined value.

13. The image forming apparatus according to claim 1, wherein the image bearer includes a base layer and an elastic layer resting on the base layer.

14. The image funning apparatus according to claim 13, wherein the elastic layer has a surface with a plurality of particles dispersed.

15. The image forming apparatus according to claim 14, wherein the plurality of particles has a charging polarity opposite a normal charging polarity of the toner.

16. The image forming apparatus according to claim 13, wherein a coating later rests on the elastic layer.

\* \* \* \* \*